US008576850B2

(12) United States Patent
Nishimura

(10) Patent No.: US 8,576,850 B2
(45) Date of Patent: Nov. 5, 2013

(54) BAND CONTROL APPARATUS, BAND CONTROL METHOD, AND STORAGE MEDIUM

(75) Inventor: Kazuto Nishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 280 days.

(21) Appl. No.: 13/071,683

(22) Filed: Mar. 25, 2011

(65) Prior Publication Data

US 2011/0243139 A1 Oct. 6, 2011

(30) Foreign Application Priority Data

Mar. 30, 2010 (JP) ................................. 2010-77819

(51) Int. Cl.
H04L 12/56 (2011.01)

(52) U.S. Cl.
USPC ........... 370/394; 370/412; 370/414; 370/428; 370/235.1; 370/235

(58) Field of Classification Search
USPC ........... 370/235.1, 230.1, 235, 412, 413, 414, 370/415, 416, 417, 418, 419, 420, 428, 429, 370/395.4, 395.41, 395.42, 395.43
See application file for complete search history.

(56) References Cited

U.S. PATENT DOCUMENTS 6,046,983 A * 4/2000 Hasegawa et al. ......... 370/236.1
7,035,220 B1 * 4/2006 Simcoe ......................... 370/236
7,280,477 B2 * 10/2007 Jeffries et al. ................. 370/235
7,298,738 B1 * 11/2007 Parruck et al. ................ 370/360
7,397,765 B2 * 7/2008 Aimoto et al. ................ 370/252
7,457,297 B2 * 11/2008 Woo et al. ................. 370/395.41
7,554,907 B1 * 6/2009 Epps et al. ..................... 370/230
7,555,560 B2 * 6/2009 Hassan .......................... 709/235
7,657,706 B2 * 2/2010 Iyer et al. ...................... 711/117
7,676,728 B2 * 3/2010 Resnick et al. ............... 714/764
2004/0022188 A1 * 2/2004 Abel et al. ..................... 370/229
2004/0213251 A1 * 10/2004 Tran et al. .................. 370/395.1
2004/0218617 A1 * 11/2004 Sagfors ......................... 370/412
2005/0036502 A1 * 2/2005 Blanc et al. ................... 370/412
2005/0157723 A1 * 7/2005 Kim et al. ..................... 370/392
2005/0185582 A1 * 8/2005 Wybenga et al. ............. 370/230
2005/0240745 A1 * 10/2005 Iyer et al. ...................... 711/167
2005/0278456 A1 * 12/2005 Hassan .......................... 709/235
2006/0050690 A1 * 3/2006 Epps et al. ..................... 370/359

(Continued)

FOREIGN PATENT DOCUMENTS

JP         9-247213 A    9/1997
JP         2008-78932    4/2008

Primary Examiner — Ian N Moore
Assistant Examiner — Phong La
(74) Attorney, Agent, or Firm — Fujitsu Patent Center

(57) ABSTRACT

A band control apparatus including: a buffer memory configured to hold and output data units on a first-in first-out basis; a counter memory configured to hold a counter value; and a processor configured to add a value to the counter value on a basis of a rule, reduce, when a first one of the data units is output from the buffer memory, cause, when a first condition of a total size of the data units being smaller than a buffer threshold is satisfied, the first data unit to be output when a second condition that the counter value is larger than the size of the first data unit is satisfied and the counter value is larger than a counter threshold, and cause, when the first condition is not satisfied, the data units to be output in sequence with the first data unit first, until a third condition is satisfied.

7 Claims, 27 Drawing Sheets

(56) References Cited

U.S. PATENT DOCUMENTS

| | | | |
|---|---|---|---|
| 2006/0092837 A1* | 5/2006 | Kwan et al. | 370/229 |
| 2006/0294312 A1* | 12/2006 | Walmsley | 711/122 |
| 2007/0091799 A1* | 4/2007 | Wiemann et al. | 370/230 |
| 2007/0113150 A1* | 5/2007 | Resnick et al. | 714/763 |
| 2007/0195778 A1* | 8/2007 | Tatar et al. | 370/392 |
| 2007/0239889 A1* | 10/2007 | Mochida et al. | 709/237 |
| 2007/0286070 A1* | 12/2007 | Schliwa-Bertling et al. | 370/229 |
| 2008/0117913 A1* | 5/2008 | Tatar et al. | 370/392 |
| 2008/0165793 A1* | 7/2008 | Abel et al. | 370/412 |
| 2009/0010165 A1* | 1/2009 | Kim et al. | 370/235 |
| 2009/0092104 A1* | 4/2009 | Kawamoto et al. | 370/336 |
| 2010/0039938 A1* | 2/2010 | Sagfors | 370/238 |
| 2010/0208592 A1* | 8/2010 | Matsuoka et al. | 370/241 |
| 2010/0246596 A1* | 9/2010 | Nakamura et al. | 370/428 |
| 2011/0075562 A1* | 3/2011 | Isaksson et al. | 370/235.1 |

* cited by examiner

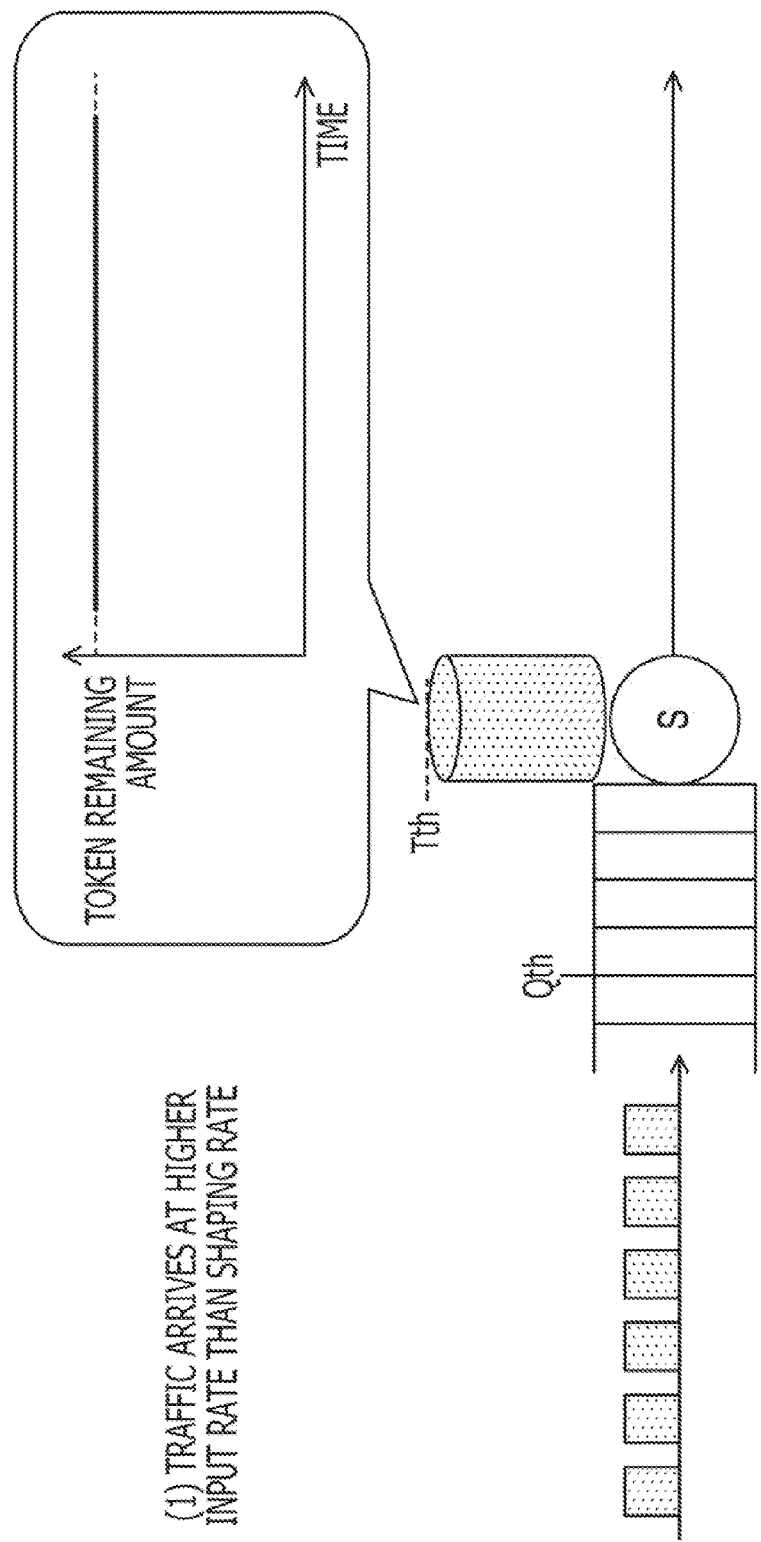

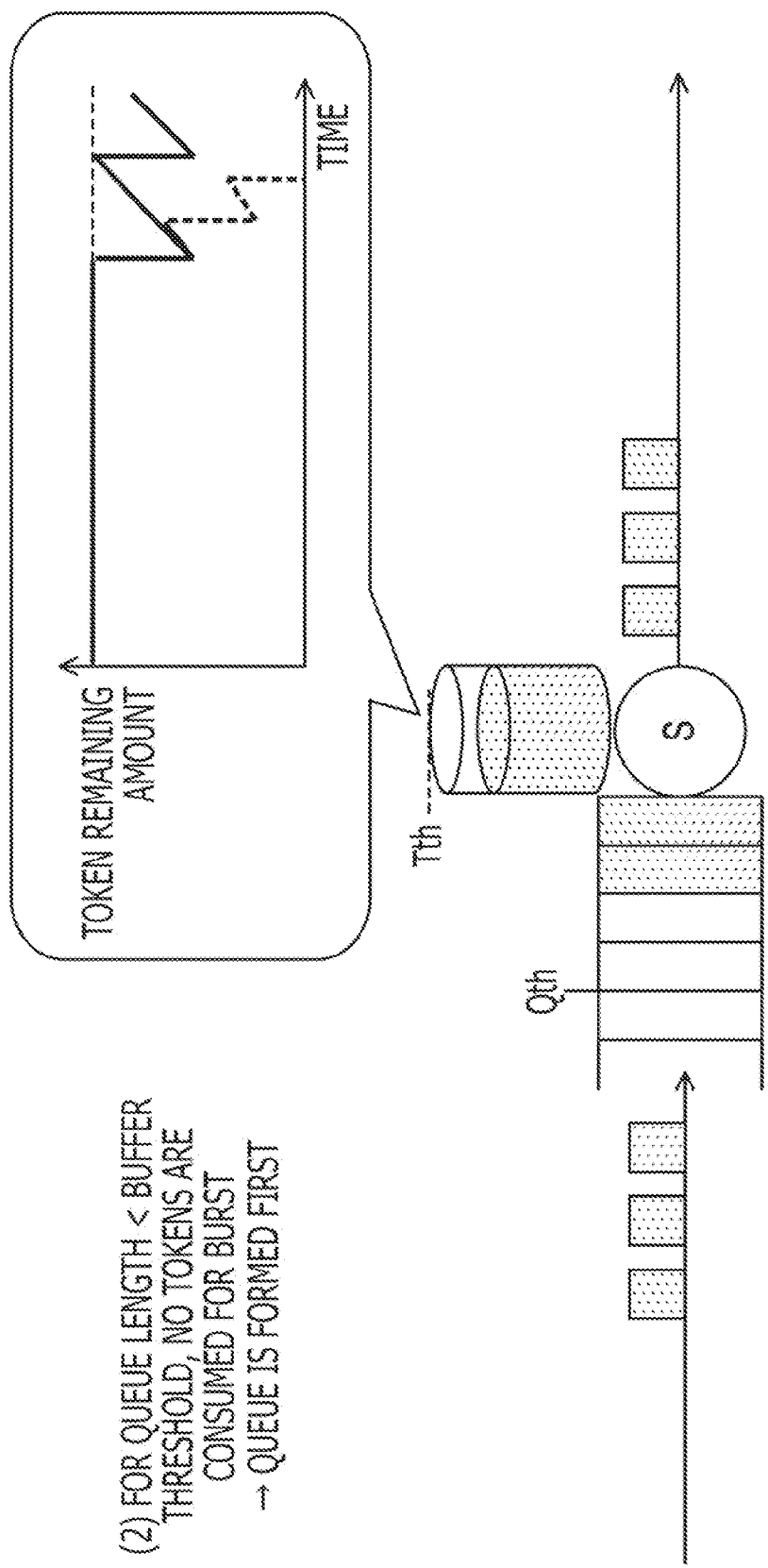

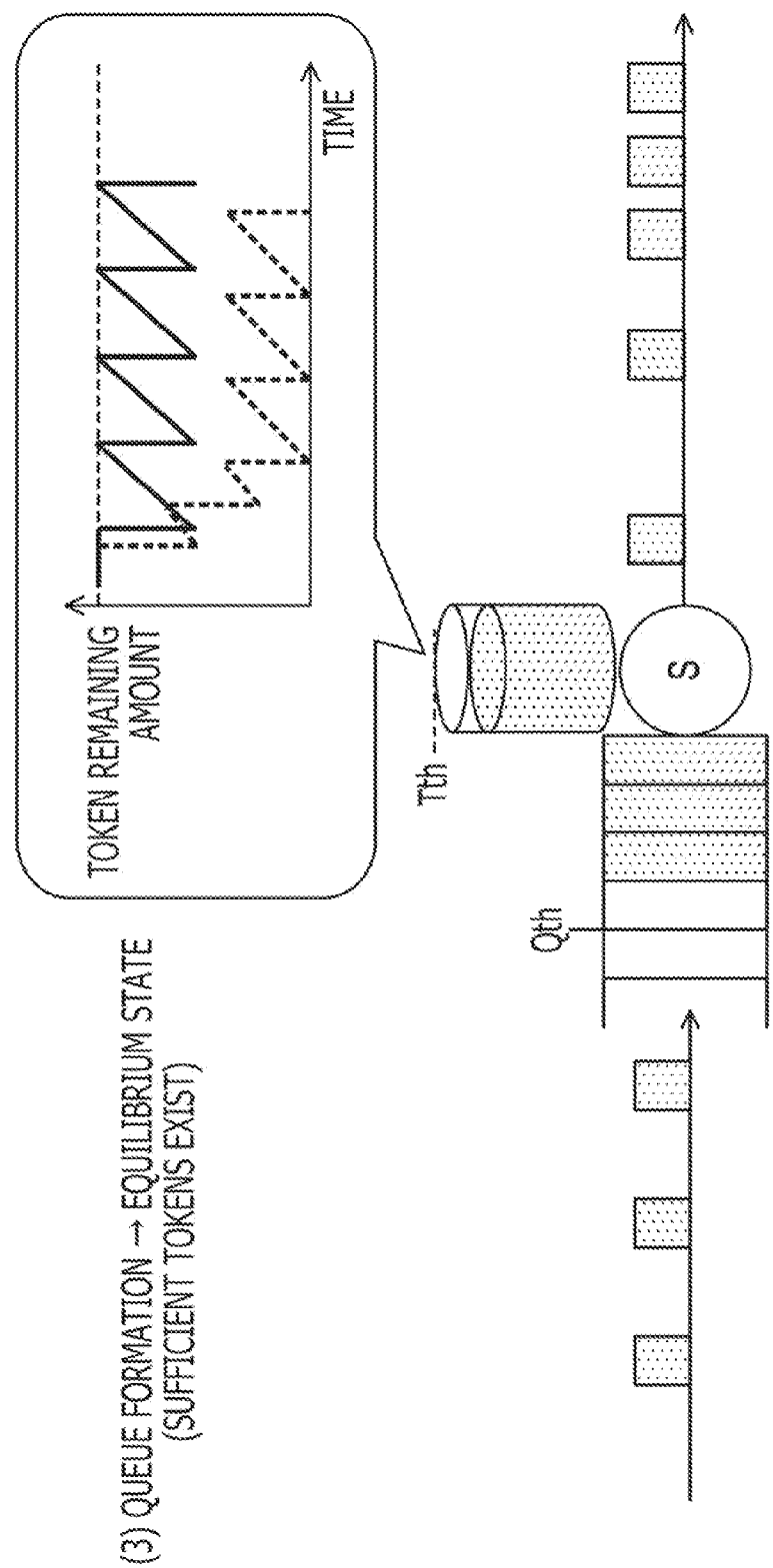

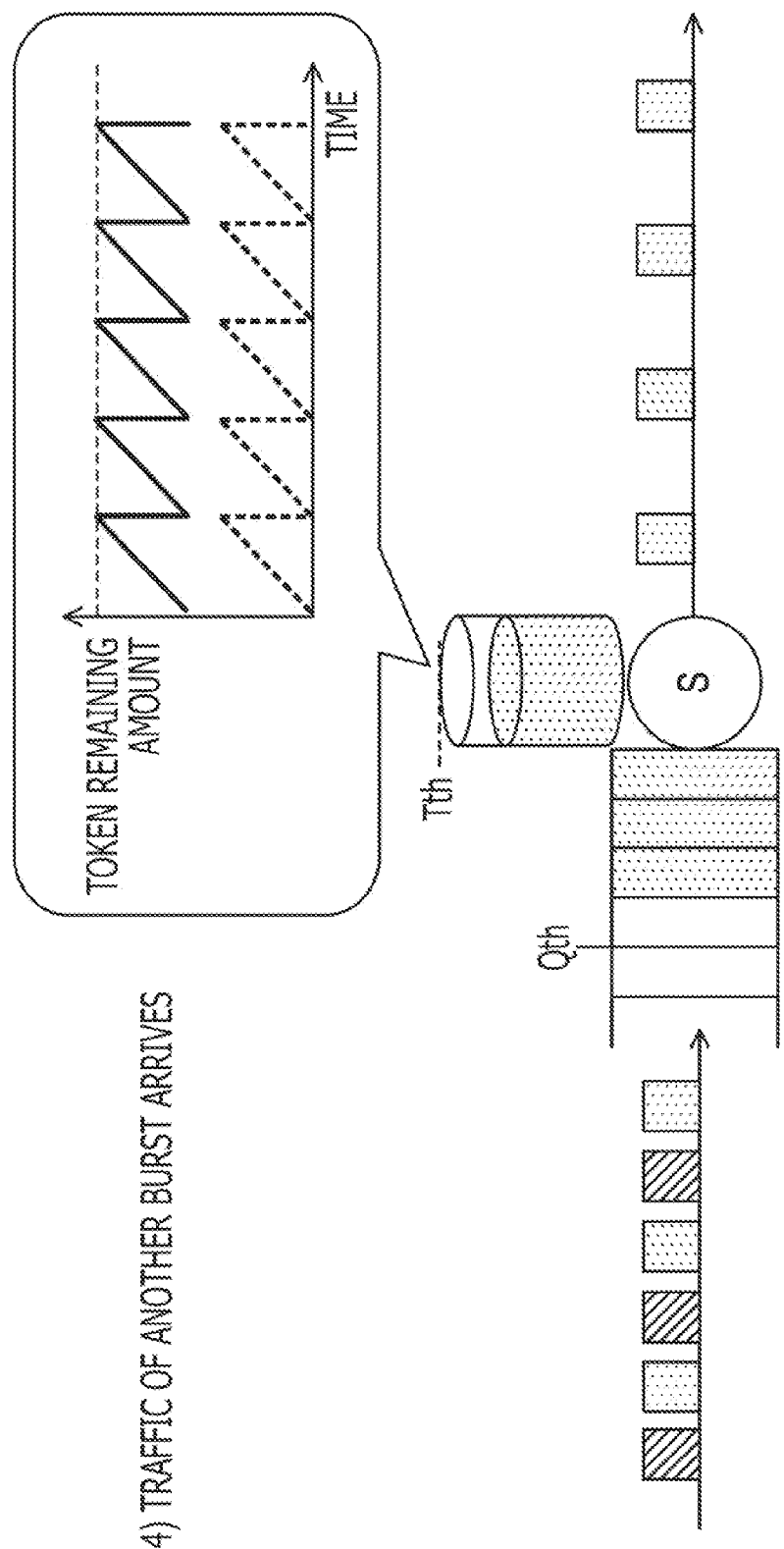

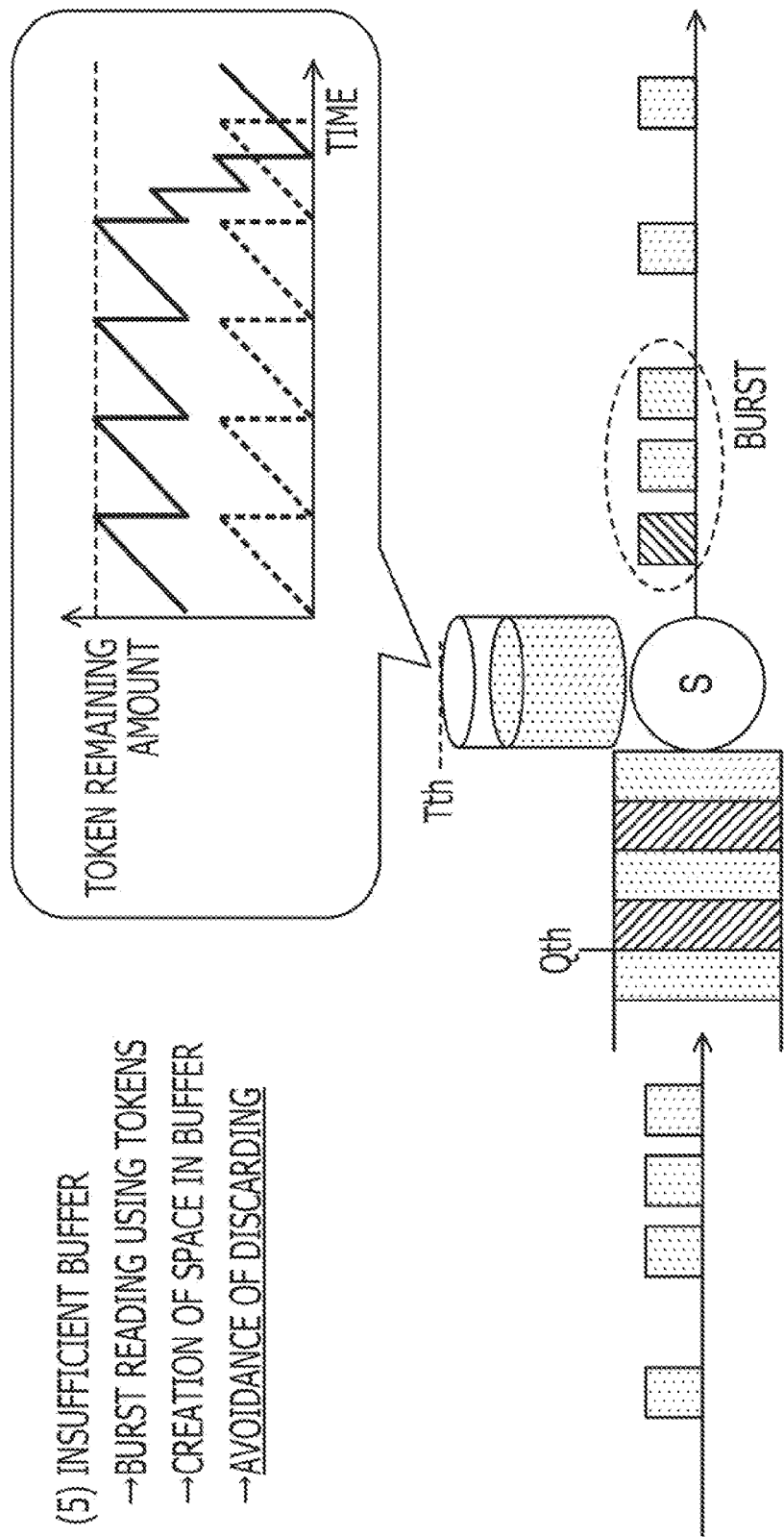

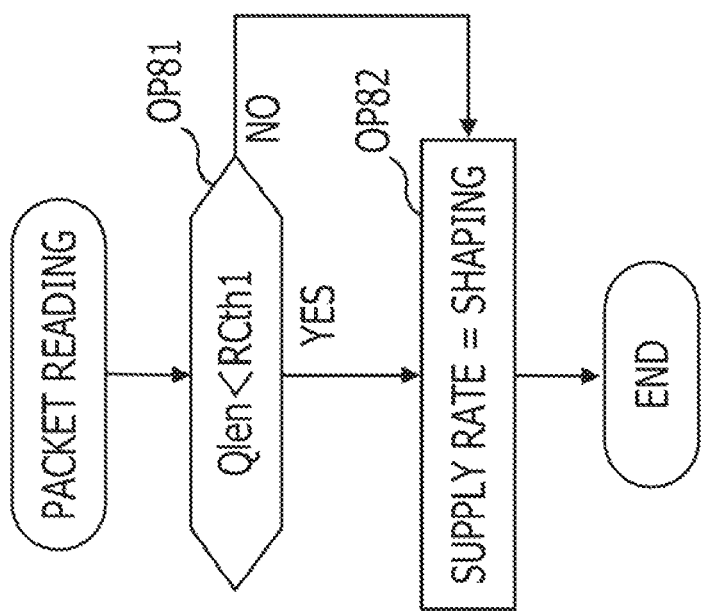

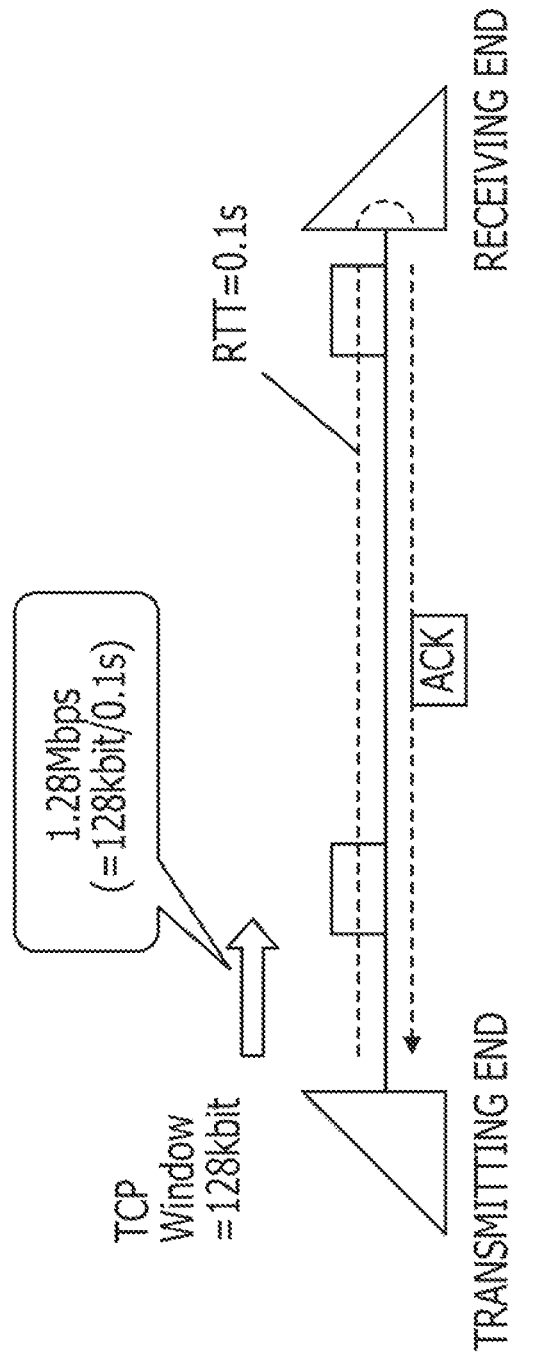

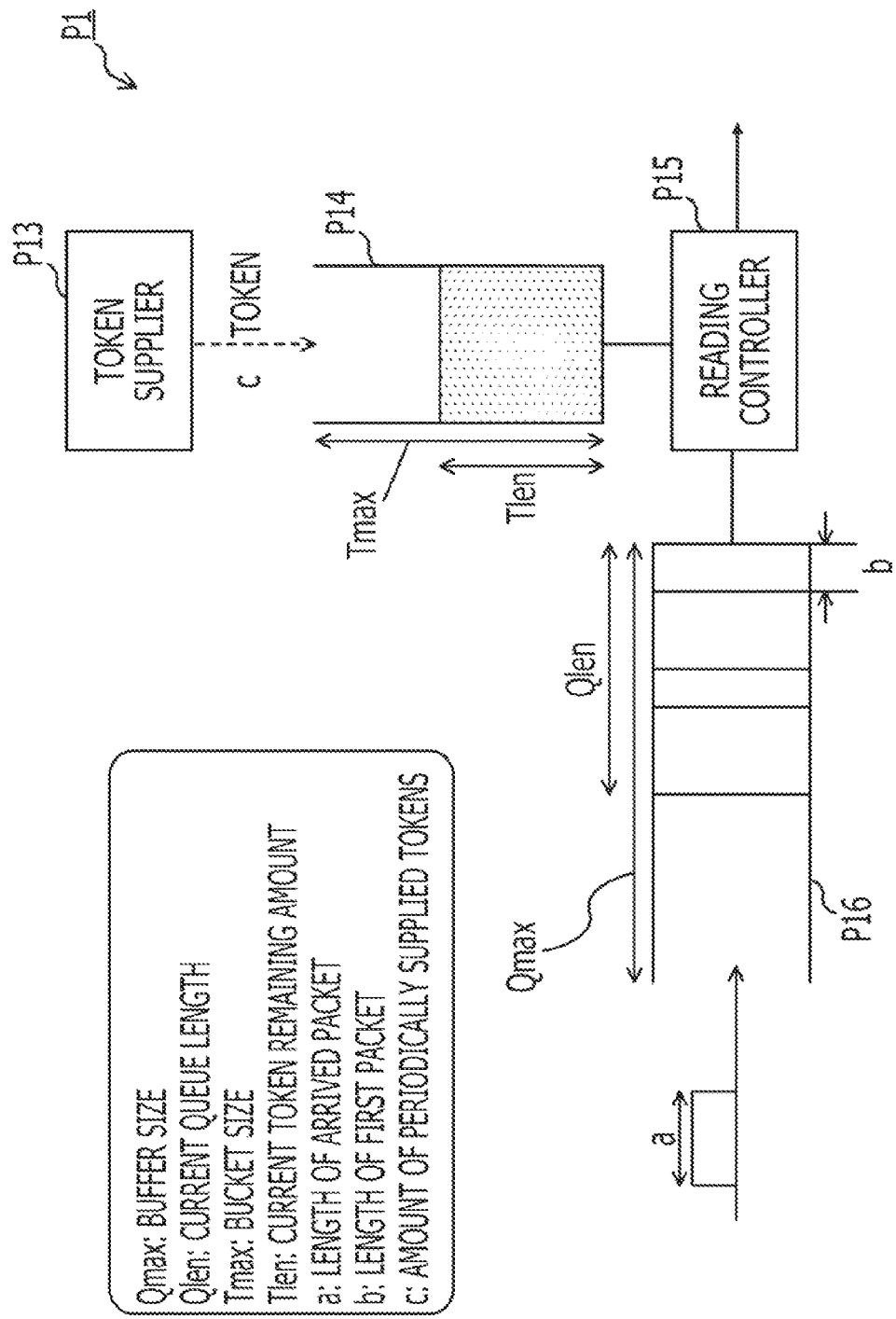

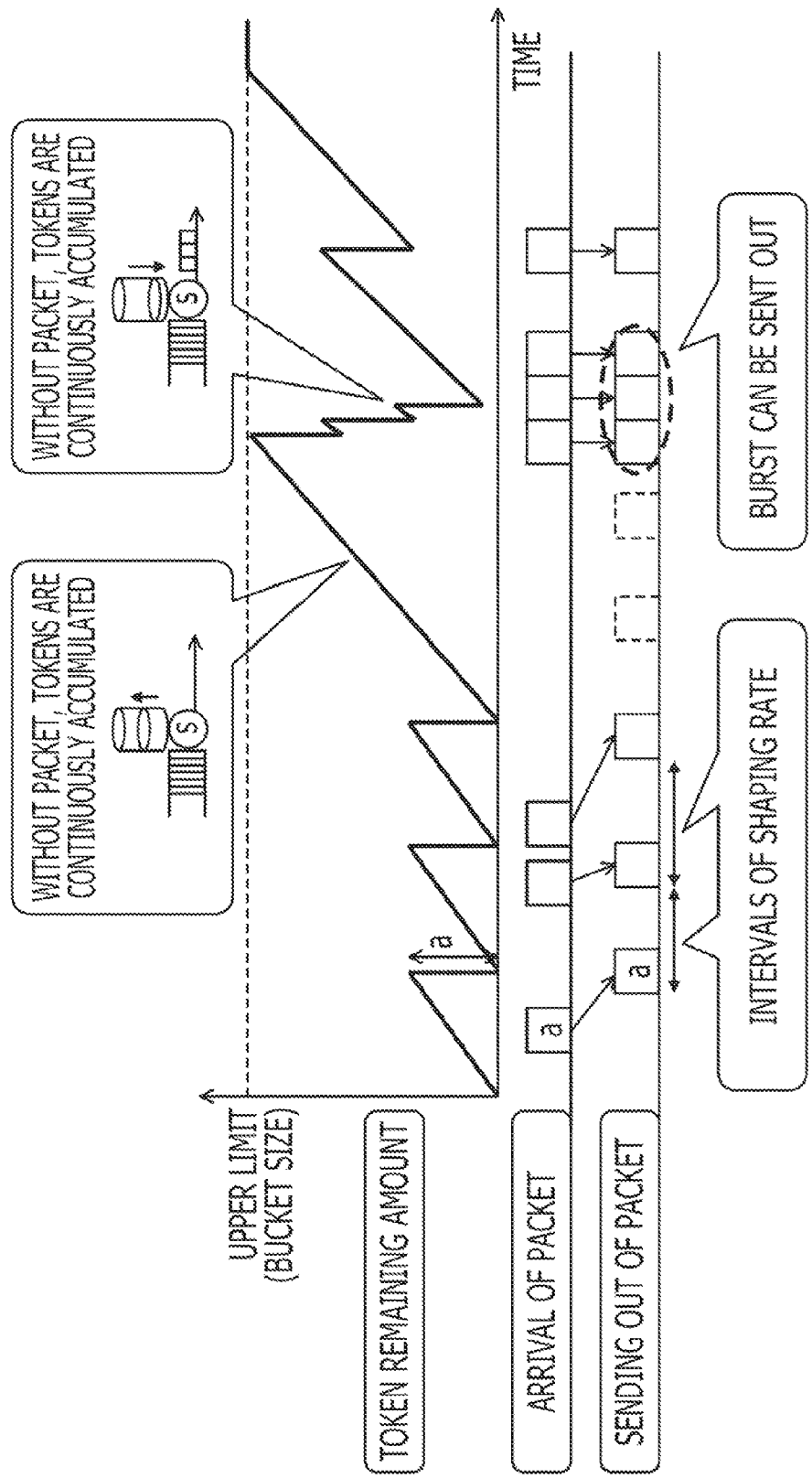

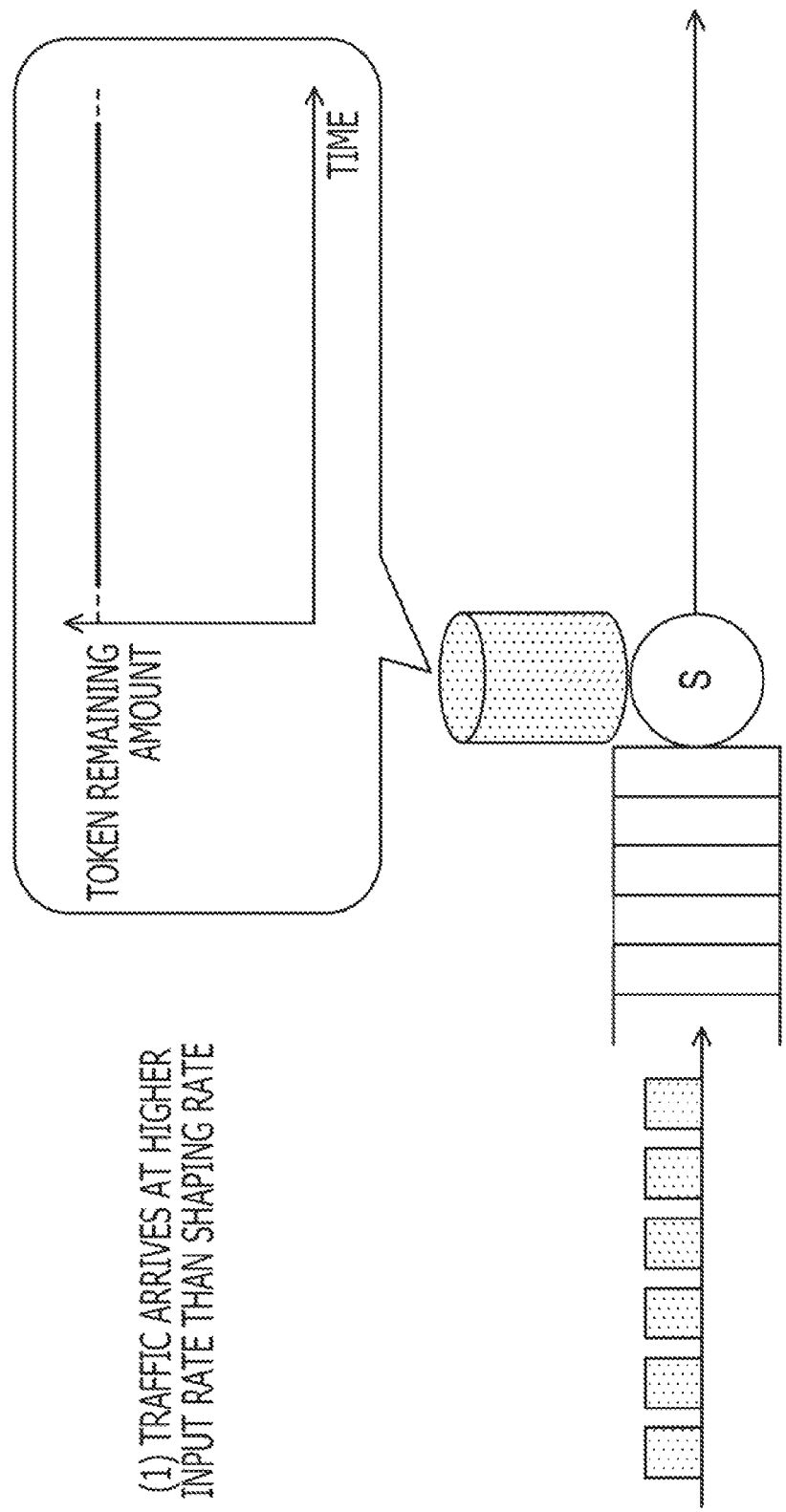

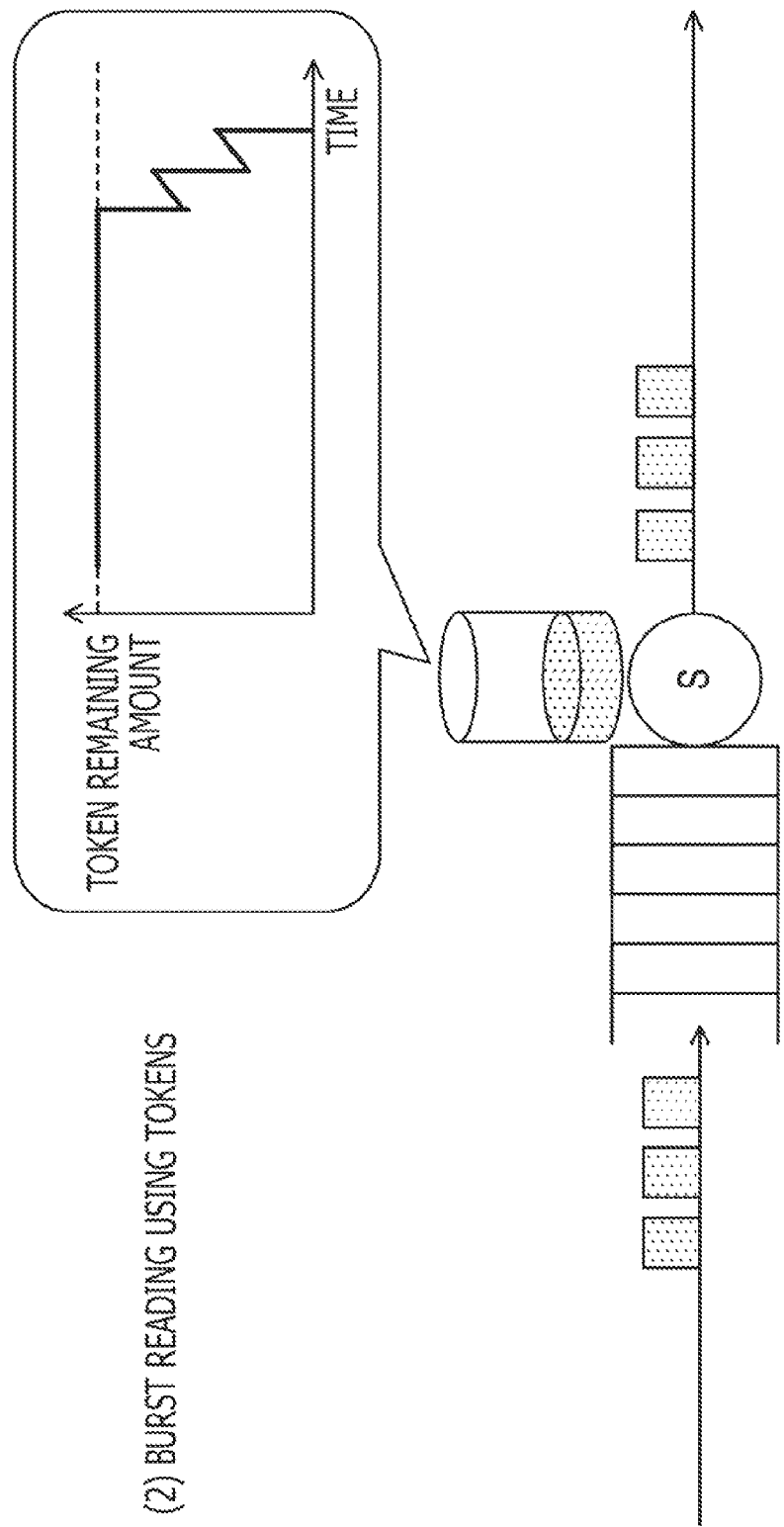

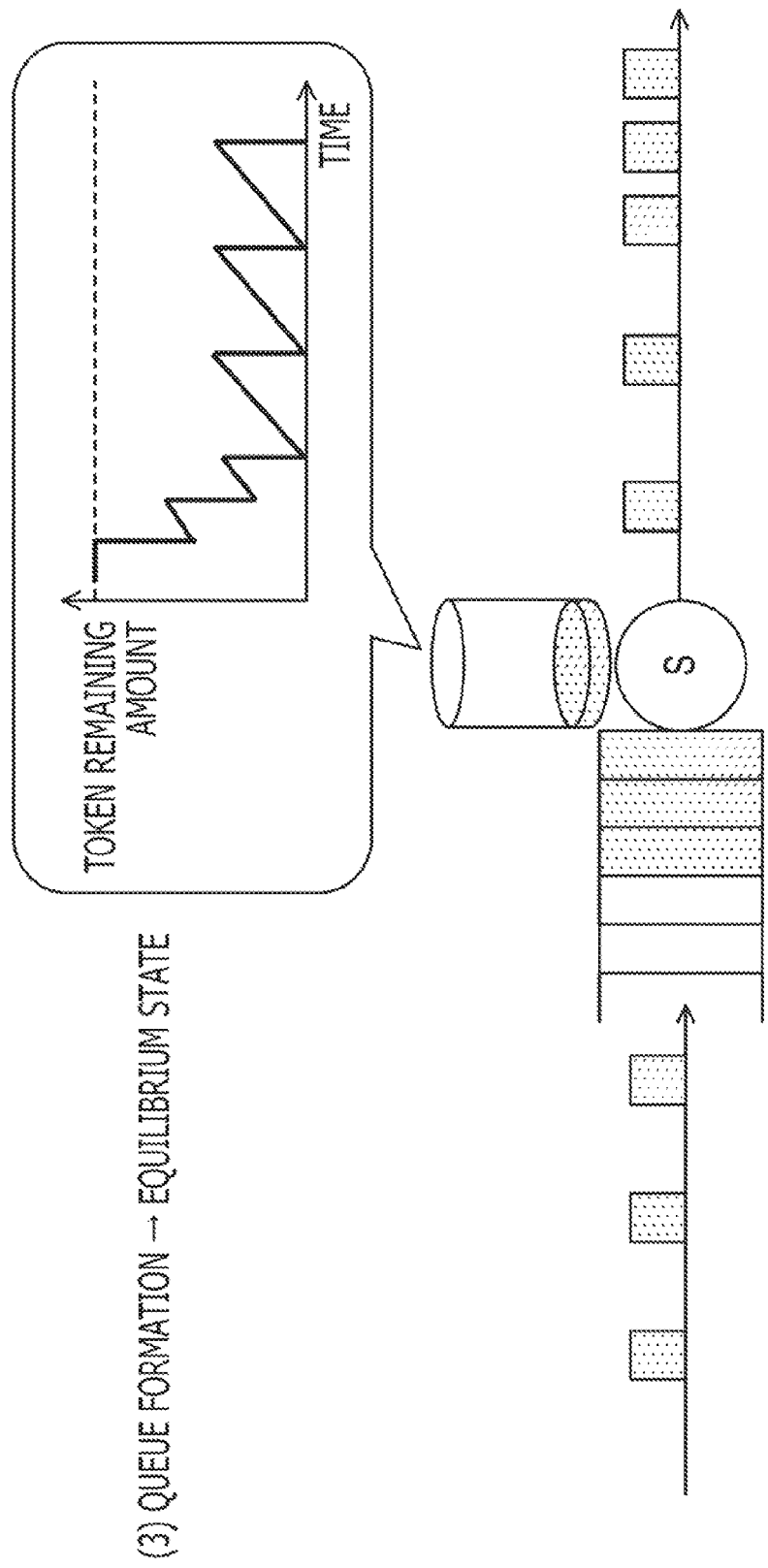

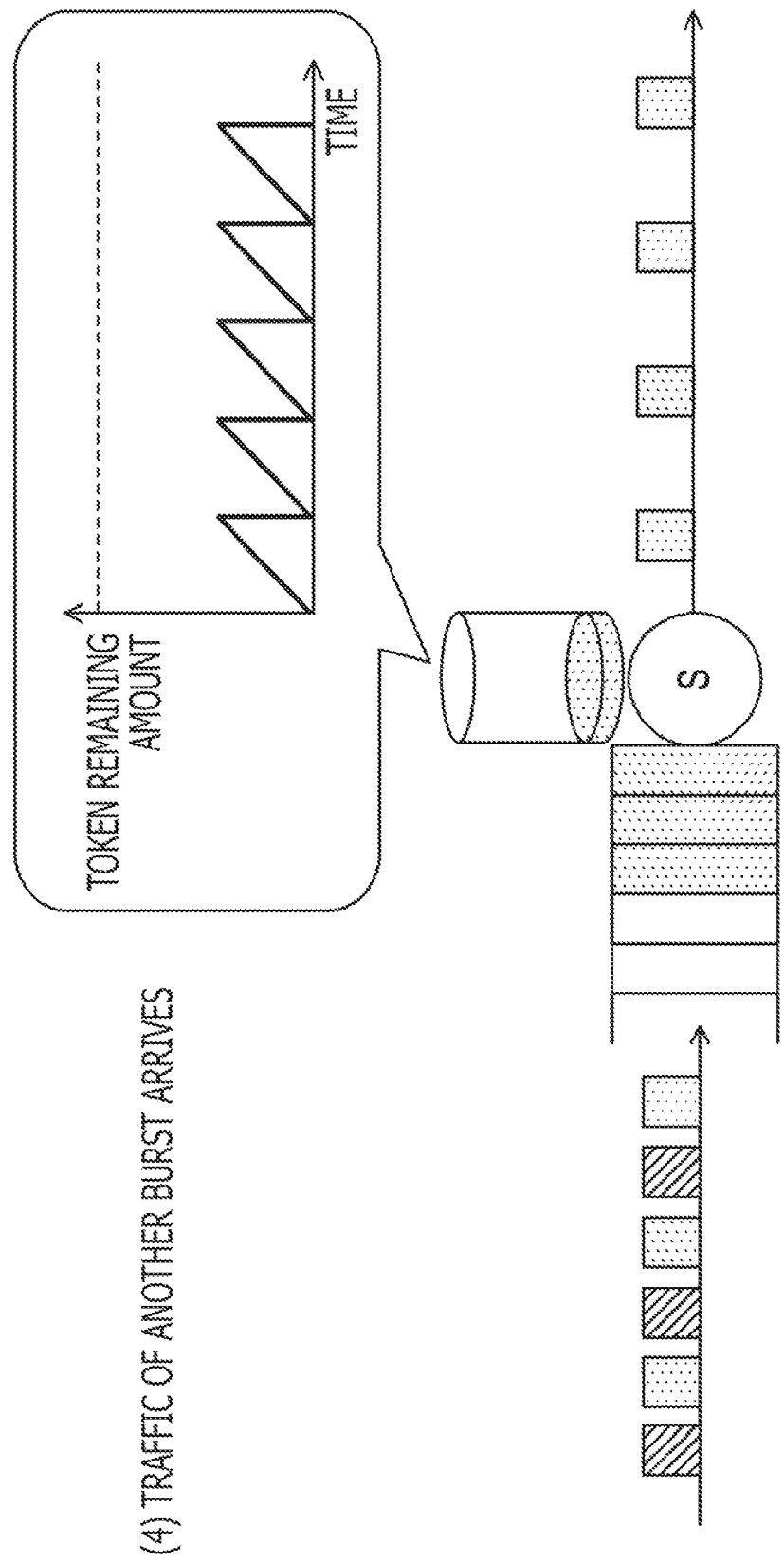

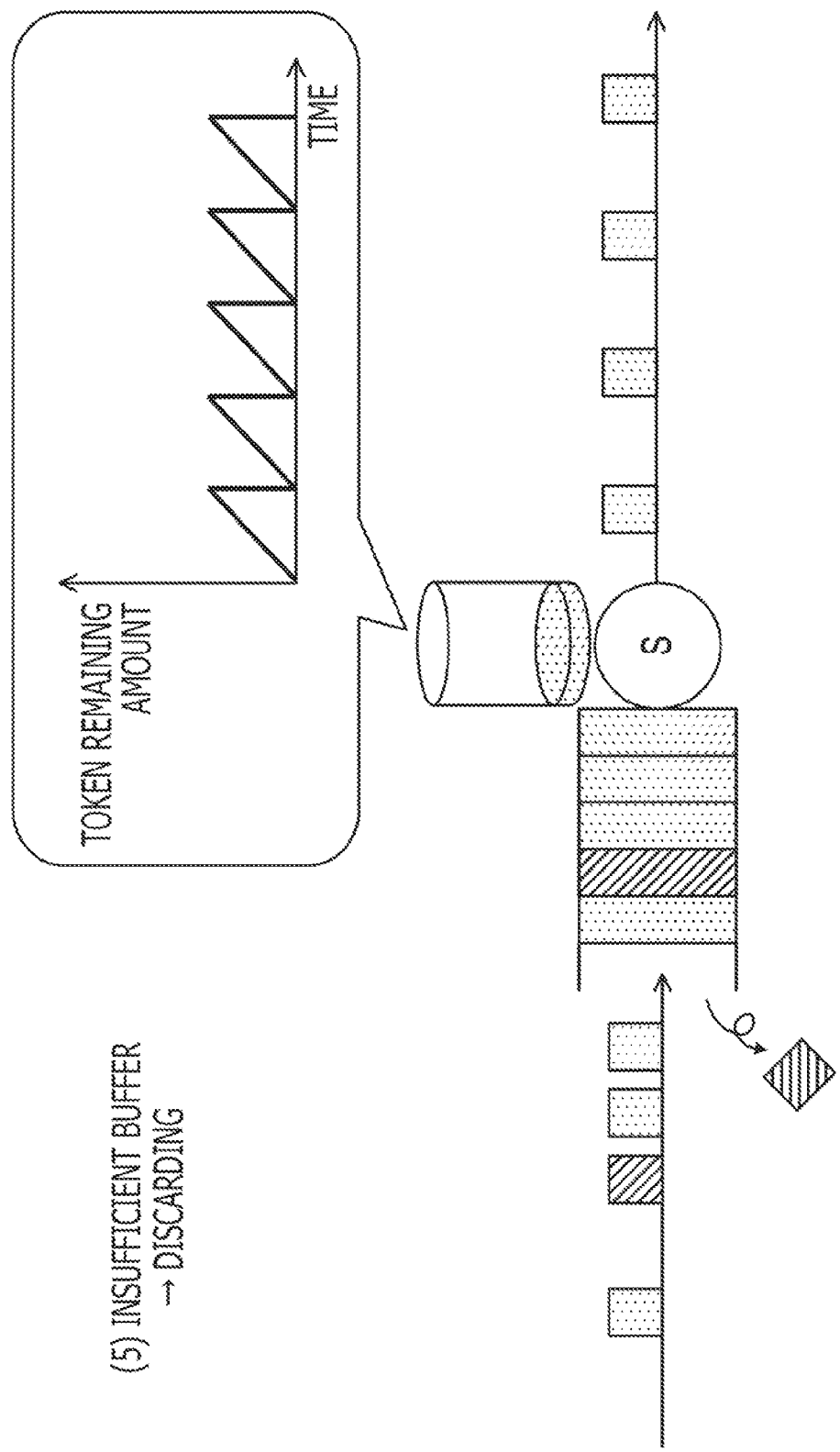

BAND CONTROL APPARATUS, BAND CONTROL METHOD, AND STORAGE MEDIUM

CROSS-REFERENCE TO RELATED APPLICATION

This application is based upon and claims the benefit of priority from the prior Japanese Patent Application No. 2010-77819 filed on Mar. 30, 2010, the entire contents of which are incorporated herein by reference.

FIELD

Embodiments described herein relate to a band control apparatus and a band control method which control a band of a network and to a storage medium.

BACKGROUND

In some connection-oriented protocols such as a TCP (transmission control protocol), an acknowledgement response (hereinafter, Ack) is returned in response to transmitted data. The time from when data is transmitted until the Ack is returned is referred to, for example, in a TCP, as "RTT (round trip time)". When the RTT increases, the throughput decreases and a delay occurs. The delay is presumed to be caused by, for example, the physical distance between a transmitting apparatus and a receiving apparatus, the number of via-nodes between the transmitting apparatus and receiving apparatuses, and buffering during congestion and so on.

FIGS. 13A and 13B illustrate a delay due to buffering. In the example illustrated in FIGS. 13A and 13B, communication is performed in a single TCP session between a transmitting apparatus and a receiving apparatus.

In FIG. 13A, the window size of the transmitting apparatus is assumed to be 128 kbits. The RTT is assumed to be 0.1 second on average. In FIG. 13A, an average throughput (an average output rate) of the transmitting apparatus is derived by:

Average Throughput=128 kbit/0.1 s=1.28 Mbps.

FIG. 13B illustrates an example in which a relay apparatus having a shaper with a shaping rate of 1 Mbps is provided between the transmitting apparatus and the receiving apparatus illustrated in FIG. 13A. In the example illustrated in FIG. 13B, at the relay apparatus, the input rate is 1.28 Mbps, whereas the output rate is limited to a shaping rate of 1 Mbps. Thus, a queue is formed in the buffer in the relay apparatus. As a result, a buffering delay, which does not occur in the example (illustrated in FIG. 13A) in which no shaper is provided, occurs in, for example, the following manner.

(1) For example, the packet length is assumed to be 1518 bytes. When two packets are evenly accumulated in the buffer in the relay apparatus, a delay due to buffering increases by about 0.024 s (1518×8×2 bit/1 Mbit).

(2) Since a delay at the relay apparatus increases by about 0.024 s, the RTT also increases by about 0.024 s to become 0.124 s (0.1 s+0.024 s).

(3) Since an increase in the RTT in the transmitting apparatus refers to an increase in the amount of time until the Ack is returned, the period of time from when the transmitting apparatus transmits one packet and receives the Ack with respect to the packet until the transmitting apparatus transmits a next packet increases. That is, the increases in the RTT reduce the average throughput of the transmitting apparatus.

In the example illustrated in FIG. 13B, the average throughput of the transmitting apparatus decreases to about 1 Mbps, as is derived by:

Average Throughput=128 kbit/0.124 s≈1 Mbps.

As a result of a reduction in the throughput of the transmitting apparatus to about 1 Mbps, the input rate of the relay apparatus in the example illustrated in FIG. 13B also decreases to about 1 Mbps. In the relay apparatus, the input rate decreases to the output rate, so that the input rate becomes substantially equal to the output rate.

As in the example illustrated in FIG. 13B, in a network in which window flow control is performed as in TCP, even when the input rate of the relay apparatus is higher than the output rate thereof, the input rate may decrease as a result of an increase in the amount of delay due to formation of a queue. A state in which the input rate of the relay apparatus and the output rate thereof become substantially equal to each other, as in the example illustrated in FIG. 13B, is referred to herein as an "equilibrium state".

The equilibrium state is a phenomenon that can occur in any connection-oriented protocol employing an acknowledge response and is not a phenomenon limited to TCP window flow control as in FIGS. 13A and 13B.

Examples of related art include Japanese Unexamined Patent Application Publication Nos. 9-247213 and 2008-78932.

SUMMARY

An embodiment of the invention relates to a band control apparatus including: a buffer memory configured to hold and output data units on a first-in first-out basis; a counter memory configured to hold a counter value; and a processor configured to add a value to the counter value on a basis of a rule, reduce, when a first one of the data units is output from the buffer memory, a value corresponding to a size of the first data unit from the counter value, cause, when a first condition of a total size of the data units held by the buffer memory being smaller than a buffer threshold is satisfied, the first data unit held by the buffer memory to be output when a second condition that the counter value is larger than the size of the first data unit held by the buffer memory is satisfied and the counter value is larger than a counter threshold, and cause, when the first condition is not satisfied, the data units held by the buffer memory to be output in sequence with the first data unit first, until a third condition is satisfied.

Another embodiment is directed to a non-transitory computer-readable storage medium in which a band control program is recorded, the band control program causing a computer to execute: adding a value to a held counter value on a basis of a rule; reducing, when a first one of data units is output from a buffer memory that holds and outputs the data units on a first-in first-out basis, a value corresponding to a size of the first data unit from the counter value; causing, when a first condition that a total size of the data units held in the buffer memory is smaller than a predetermined buffer threshold is satisfied, the first data unit held in the buffer memory to be output when a second condition that the counter value is larger than the size of the first data unit held in the buffer memory is satisfied and the counter value is larger than a predetermined counter threshold; and causing, when the first condition is not satisfied, the data units held in the buffer memory to be output in sequence with the first data unit first, until a third condition is satisfied.

The object and advantages of the invention will be realized and attained by at least the elements, features, and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6A illustrates an example when traffic of another burst arrives while the shaper is in an equilibrium state;

FIG. 6B illustrates the example when the traffic of another burst arrives while the shaper is in the equilibrium state;

FIG. 6C illustrates the example when the traffic of another burst arrives while the shaper is in the equilibrium state;

FIG. 6D illustrates the example when the traffic of another burst arrives while the shaper is in the equilibrium state;

FIG. 6E illustrates the example when the traffic of another burst arrives while the shaper is in the equilibrium state;

FIG. 12 illustrates an example of a flow of token-supply-rate determination processing after packet reading from the shaper is finished;

FIG. 13A illustrates a delay due to buffering;

FIG. 14 is a diagram illustrating an example of the configuration of a token bucket shaper;

FIG. 17 illustrates an example in which relationships of the remaining amount of tokens, arrival of packets, and sending out of packets when the token bucket shaper is used are illustrated time-sequentially;

FIG. 18A illustrates an example when traffic of another burst arrives while the token bucket shaper is in an equilibrium state;

FIG. 18B illustrates the example when the traffic of another burst arrives while the token bucket shaper is in the equilibrium state;

FIG. 18C illustrates the example when the traffic of another burst arrives while the token bucket shaper is in the equilibrium state;

FIG. 18D illustrates the example when the traffic of another burst arrives while the token bucket shaper is in the equilibrium state; and FIG. 18E illustrates the example when the traffic of another burst arrives while the token bucket shaper is in the equilibrium state.

DESCRIPTION OF EMBODIMENTS

Figure 13B:
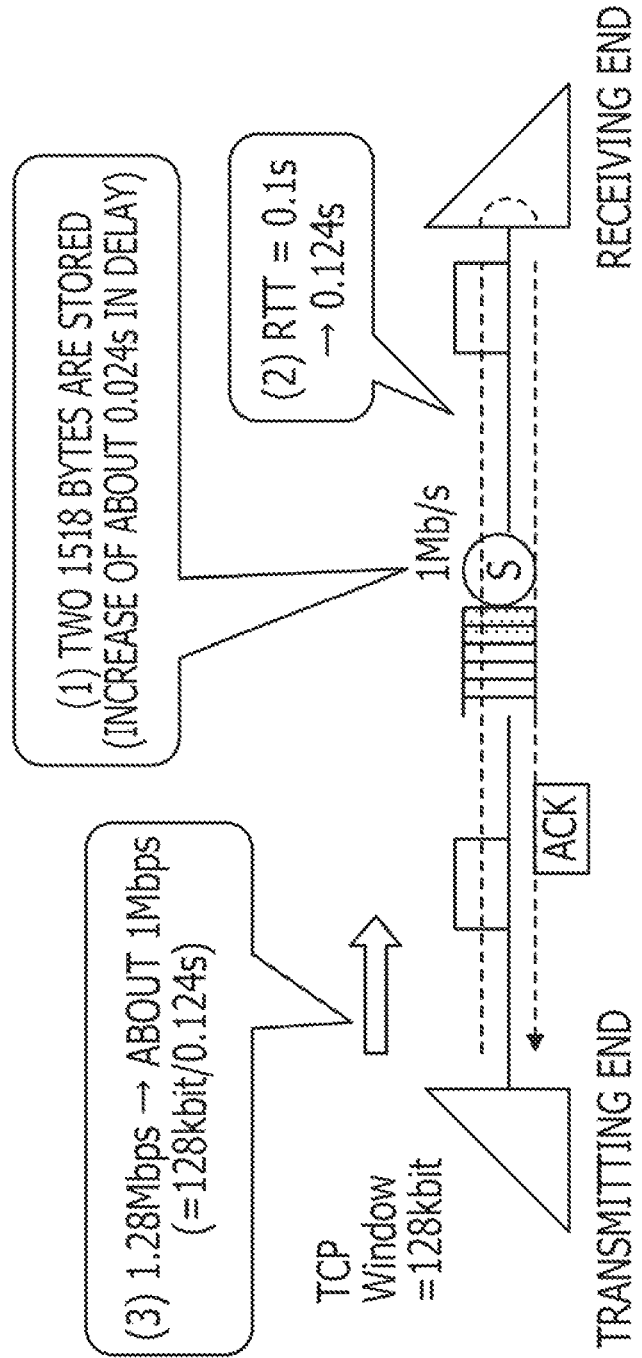
FIG. 13B illustrates a delay due to buffering.

In an equilibrium state as illustrated in FIG. 13B, if another flow for transmitting a large amount of data occurs between a transmitting apparatus and a receiving apparatus, there is a case in which a buffer in the relay apparatus overflows and packets that arrive at the relay apparatus subsequently are discarded. Bursty transmission or reception of a large amount of data in a network is called a burst.

In TCP communication, when loss of packets occurs, the packets are retransmitted under TCP retransmission control. When congestion occurs in the network, the packet retransmission could deteriorate the state of the congestion. That is, the packet discarding at the relay apparatus leads to deterioration of the congestion state.

One embodiment of the present invention is aimed to provide a band control apparatus that reduces packet discarding in the equilibrium state.

Embodiments of the present invention will be described below with reference to the accompanying drawings. The configurations of the embodiments described below are merely exemplary and illustrative, and the present invention is not limited thereto.

<Token Bucket Shaper>

FIG. 14 is a diagram illustrating an example of the configuration of a token bucket shaper. A shaper P1 is a band control apparatus for controlling a network band by making an output rate substantially correspond to or match a shaping rate. The token bucket shaper P1 includes a token supplier P13, a token bucket P14, a reading controller P15, and a buffer memory P16.

The token supplier P13 periodically supplies tokens, which represent a transmission right, to the token bucket P14. In addition to periodically supplying tokens to the token bucket P14, the token supplier P13 may also supply tokens to the token bucket P14 upon arrival of a packet. The tokens represent a transmission right for determining the data size of a packet permitted to be transmitted. For example, the data size of a packet permitted to be transmitted is predetermined in units of bytes per token and the number of tokens supplied at a time may also be predetermined. The data size of a packet whose transmission is permitted by one or more tokens will hereinafter be referred to as an "amount of tokens". The amount of tokens supplied at a time by the token supplier P13 and the period of the supply may be predetermined. The amount of tokens supplied in a predetermined period of time (i.e., a token supply rate) is the same as the shaping rate of the shaper P1.

The token bucket P14 holds the tokens supplied from the token supplier P13. The shaper P1 can read a packet or packets from the buffer memory P16 by an amount corresponding to the amount of tokens held by the token bucket P14. When a packet is read from the buffer memory P16, the tokens are reduced from the token bucket P14 by an amount of tokens corresponding to the size of the read packet. When the token bucket P14 has no tokens, the shaper P1 cannot read a packet from the buffer memory P16. A maximum value of a bucket size that can hold tokens is preset for the token bucket P14. Hereinafter, the amount of tokens held in the token bucket P14 may also be referred to as a "token remaining amount". The remaining amount of tokens is indicated by Tlen. The bucket size of the token bucket is indicated by Tmax.

The buffer memory P16 temporarily stores packets in the order of arrival at the shaper P1. The packets held in the buffer memory P16 form a queue to wait for their turns to be read. The total size of packets held by the buffer memory P16 is also called a queue length. A maximum value of the buffer size that can hold packets, i.e., a maximum value of the queue length, is also set for the buffer memory P16. The queue length is indicated by Qlen. The buffer size of the buffer memory (i.e., the maximum value of the queue length) is indicated by Qmax.

The reading controller P15 reads packets held by the buffer memory P16, in accordance with the token remaining amount of the token bucket P14. The reading controller P15 can read packets from the buffer memory P16 by an amount corresponding to the token remaining amount Tlen. Upon reading a packet from the buffer memory P16, the reading controller P15 reduces, from the token bucket P14, tokens corresponding to the size of the read packet. That is, by using (consuming) the tokens held by the token bucket P14, the reading controller P15 reads a packet from the buffer memory P16.

Figure 15:
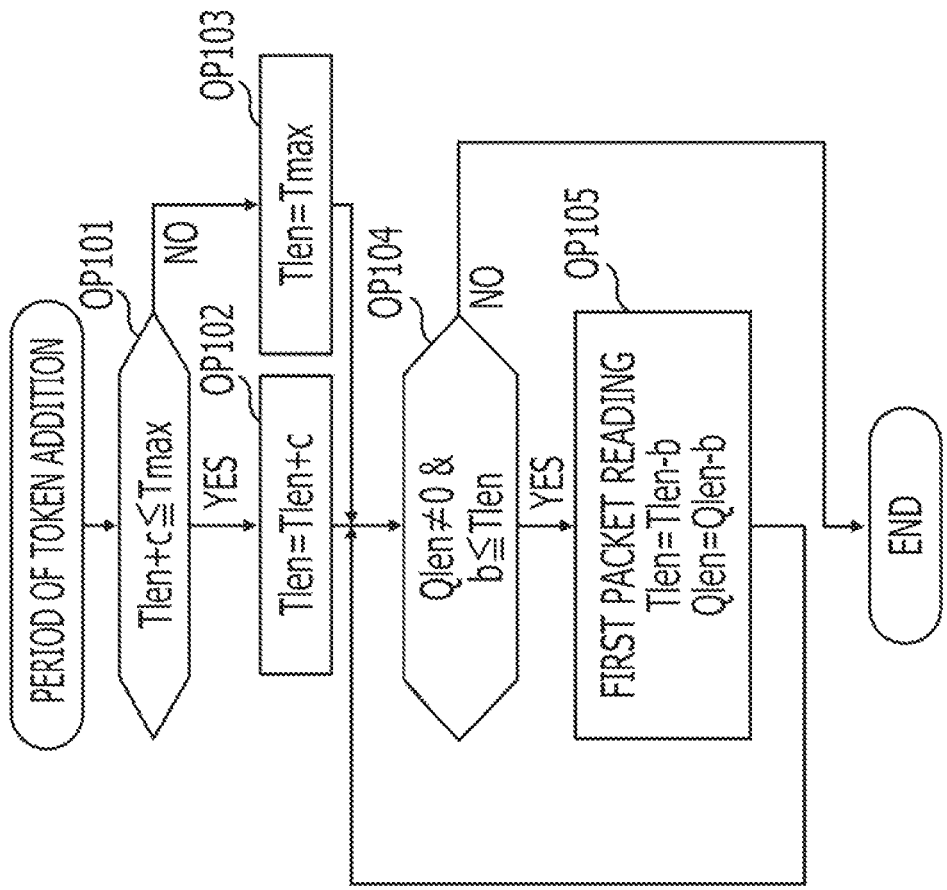
FIG. 15 illustrates an example of a flow of reading processing when tokens are supplied to a token bucket.

FIG. 15 illustrates an example of a flow of packet reading processing when tokens are supplied to the token bucket P14.

For example, when tokens are supplied from the token supplier P13 to the token bucket P14 in a token-supply period, processing is started. The amount of tokens supplied from the token supplier P13 to the token bucket P14 at a time is expressed by c.

When the sum of the token remaining amount Tlen and the amount "c" of supplied tokens is smaller than or equal to the bucket size Tmax of the token bucket P14 (Yes in operation OP101), the process proceeds to operation OP102 in which the token remaining amount Tlen is updated to the sum of the token remaining amount Tlen and the amount "c" of supplied tokens.

When the sum of the token remaining amount Tlen and the amount "c" of supplied tokens is larger than the bucket size Tmax of the token bucket P14 (No in operation OP101), the process proceeds to operation OP103 in which the token remaining amount Tlen becomes the bucket size Tmax of the token bucket P14.

The reading controller P15 determines whether or not packets are held in the buffer memory P16, i.e., whether or not a queue is formed in the buffer memory P16. In addition, in operation OP104, the reading controller P15 determines whether or not the token remaining amount Tlen is larger than or equal to the size b of a first one of the packets in the queue.

When a queue is formed in the buffer memory P16 and the token remaining amount Tlen is larger than or equal to the size b of the first packet in the queue (Yes in operation OP104), the reading controller P15 reads the first packet in the queue in operation OP105. The reading controller P15 reduces, from the token bucket P14, tokens corresponding to the size b of the read first packet. The token remaining amount Tlen becomes a value obtained by subtracting the size b of the first packet read from the buffer memory P16. The queue length Qlen becomes a value obtained by subtracting the size b of the read first packet. Thereafter, the process returns to operation OP104, and as long as the condition in operation OP104 is satisfied, packets are read from the buffer memory P16.

When no queue is formed in the buffer memory P16 or when the token remaining amount Tlen is smaller than the size b of the first packet in the queue (No in operation OP104), no packet is read from the buffer memory P16 and the processing ends.

Figure 16:
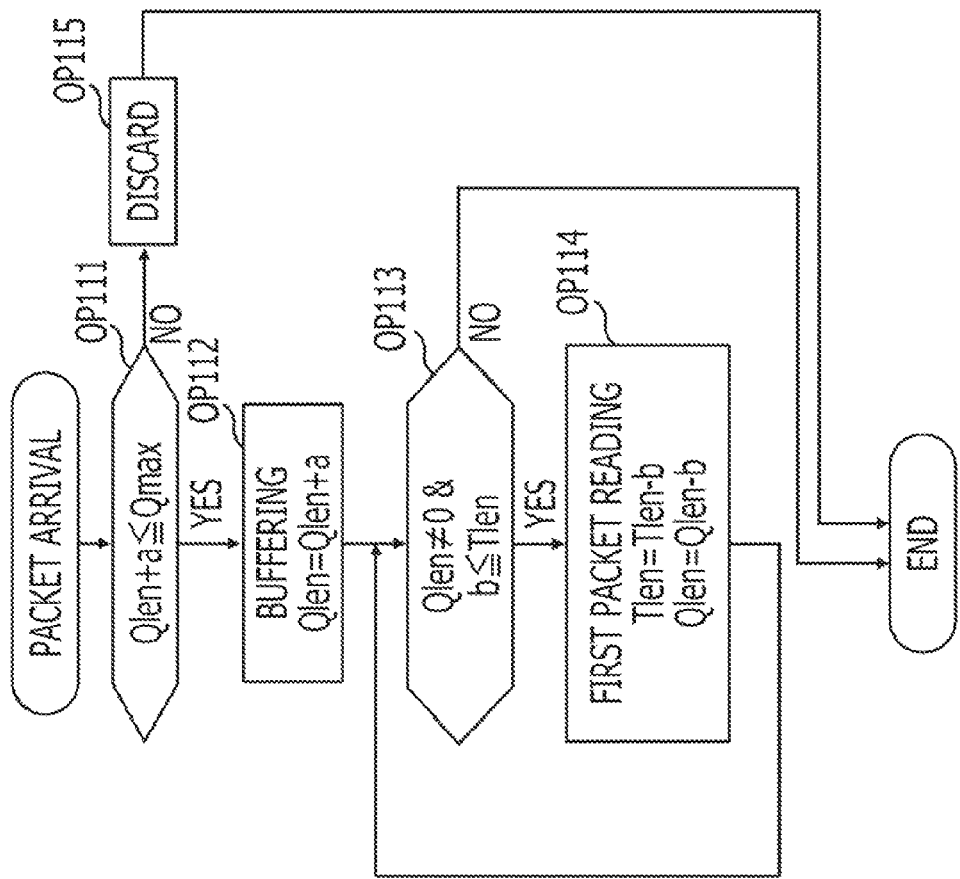
FIG. 16 illustrates an example of a flow of packet reading processing when a packet arrives at a buffer memory.

FIG. 16 illustrates an example of a flow of packet reading processing when a packet arrives at the shaper P1. When a packet arrives at the buffer memory P16, processing is started. The size of the packet that arrives at the buffer memory P16 is expressed by a.

When the sum of the queue length Qlen and the size a of the arrived packet is larger than the buffer size Qmax (No in operation OP111), this means that a buffer overflow occurs and thus the arrived packet is discarded in operation OP115.

When the sum of the queue length Qlen and the size a of the arrived packet is smaller than or equal to the buffer size Qmax (Yes in operation OP111), the arrived packet is buffered in the buffer memory P16 in operation OP112. The queue length Qlen becomes a value obtained by adding the size a of the arrived packet.

The reading controller P15 determines whether or not packets are held in the buffer memory P16, i.e., whether or not a queue is formed in the buffer memory P16. In addition, in operation OP113, the reading controller P15 determines whether or not the token remaining amount Tlen is larger than or equal to the size b of a first one of the packets in the queue.

When a queue is formed in the buffer memory P16 and the token remaining amount Tlen is larger than or equal to the size b of the first packet in the queue (Yes in operation OP113), the reading controller P15 reads the first packet in the queue in operation OP114. The reading controller P15 reduces, from the token bucket P14, tokens corresponding to the size b of the read first packet. The token remaining amount Tlen becomes a value obtained by subtracting the size b of the first packet read from the buffer memory P16. The queue length Qlen becomes a value obtained by subtracting the size b of the read first packet. Thereafter, the process returns to operation OP113, and as long as the condition in operation OP113 is satisfied, the processing in operation OP114 is repeated and packets are read from the buffer memory P16. When only an arrived packet is held in the buffer memory P16, i.e., when the arrived packet is the first packet, the arrived packet is read and the size a of the arrived packet is reduced from the token remaining amount Tlen.

When no queue is formed in the buffer memory P16 or when the token remaining amount Tlen is smaller than the size b of the first packet in the queue (No in operation OP113), no packet is read from the buffer memory P16 and the processing ends.

As illustrated in FIGS. 15 and 16, in the token bucket shaper P1, packets are read until packets held in the buffer memory P16 run out or until tokens are depleted.

FIG. 17 illustrates an example in which relationships of the token remaining amount, arrival of packets, and sending out of packets when the token bucket shaper is used are illustrated time-sequentially. In the graph illustrated in FIG. 17, the horizontal axis indicates time and the vertical axis indicates the token remaining amount of the token bucket. In FIG. 17, it is assumed that, in an initial state, the token bucket is empty and no packet is held in the buffer memory. For simplicity of description, all of the sizes of packets that arrive at the shaper are assumed to be a.

When a packet arrives in a period from the initial state until tokens corresponding to the packet size a are accumulated in the token bucket, the arrived packet is held in the buffer memory until tokens having an amount that is larger than or equal to the packet size a are accumulated in the token bucket. When tokens are accumulated and the token remaining amount is larger than or equal to the packet size a, a first packet in the buffer memory is read. The size a of the read packet is reduced from the token remaining amount, so that the token remaining amount returns to its initial state again. When a packet arrives next time, no packet is read until the token remaining amount becomes larger than or equal to the size a of the arrived packet, as in the manner described above. Packet reading is performed after the token remaining amount becomes larger than or equal to the size a of the arrived packet. As described above, upon arrival of a packet when the token bucket is empty, the initial state, the transient state from the initial state until accumulation of tokens corresponding to the size a of the arrived packet, and the state in which the tokens corresponding to the size a of the arrived packet are accumulated are repeated. While the initial state, the transient state until accumulation of tokens corresponding to the size a of the arrived packet, and the state in which the tokens corresponding to the size a of the arrived packet are accumulated are repeated, packets are read from the shaper at the token supply rate, i.e., the shaping rate.

When no packet arrives for a while and a state in which no packet is held in the buffer memory continues, tokens are periodically supplied to and accumulated in the token bucket (see FIG. 15). When tokens are accumulated to reach the bucket size of the token bucket, tokens supplied thereafter are discarded.

For example, when the token remaining amount of the token bucket is the upper-limit value and a large amount of packets, i.e., a burst, arrives, the shaper can send out the burst until the token remaining amount falls below the packet size a (see FIG. 16). The shaper can output the packets of the burst at once by using the tokens held in the token bucket and can temporarily send out packets at an output rate exceeding the shaping rate.

When a burst occurs, the token bucket shaper can read packets corresponding to the amount of tokens, held in the token bucket, from the buffer memory at once. The token bucket shaper can read packets corresponding to up to the bucket size from the buffer memory at once. Reading multiple packets from the buffer memory at once will hereinafter be referred to as "burst reading". Thus, it can be said that the token bucket shaper has a certain degree of burst tolerance. However, in the token bucket shaper, since no consideration is given to the equilibrium state, there is a possibility that it does not have a sufficient tolerance when traffic of another burst occurs in the equilibrium state, as described below.

FIGS. 18A, 18B, 18C, 18D, and 18E illustrate an example of an operation when traffic of another burst arrives when the token bucket shaper is in the equilibrium state. In FIGS. 18A, 18B, 18C, 18D, and 18E, graphs of the token remaining amount of the token bucket are schematically depicted in the extra illustrations. In the graph of the token remaining amount, the horizontal axis indicates time and the vertical axis indicates a token remaining amount. In FIGS. 18A, 18B, 18C, 18D, and 18E, all of the sizes of packets that arrive at the shaper are assumed to be the same, for simplicity of description.

(1) It is assumed that when the token remaining amount of the token bucket is maximum, TCP traffic arrives at the shaper at an input rate that is higher than the shaping rate (in FIG. 18A).

(2) Since a sufficient amount of tokens are accumulated in the token bucket, the arrived packet is read from the buffer memory at the same rate as the input rate until the tokens in the token bucket are depleted (in FIG. 18B). That is, the shaper can read a burst.

(3) Once the tokens are depleted, packet reading is performed after accumulation of tokens is waited for. Thus, packets can be read from the buffer memory at only the shaping rate and a queue is beginning to be formed in the buffer memory. As described with reference to FIGS. 13A and 13B, since an RTT increases as a result of formation of a queue, the input rate decreases after a while and the equilibrium state is reached (in FIG. 18C). In this state, the token remaining amount repeatedly takes a value in the range of 0 to an amount corresponding to the size of the arrived packet.

(4) It is assumed that burst traffic belonging to a TCP communication that is different from the TCP flow in the equilibrium state arrives (in FIG. 18D).

(5) However, in the state in which the flow in the equilibrium state exists, packet reading from the buffer memory is performed at only the shaping rate and thus the supply of tokens do not keep up therewith. Thus, the arrived packets are accumulated in the buffer memory one after another. The amount of buffer memory becomes insufficient gradually, and when a buffer overflow occurs, a packet that arrives subsequently is discarded (in FIG. 18E).

As described above, when new burst traffic arrives while the token bucket shaper is in the equilibrium state, there is a possibility that a buffer overflow occurs and packets are discarded.

First Embodiment

A relay apparatus is provided between a transmitting apparatus and a receiving apparatus on a network to relay plackets. The relay apparatus has a token bucket shaper as a band control apparatus.

Figure 1:
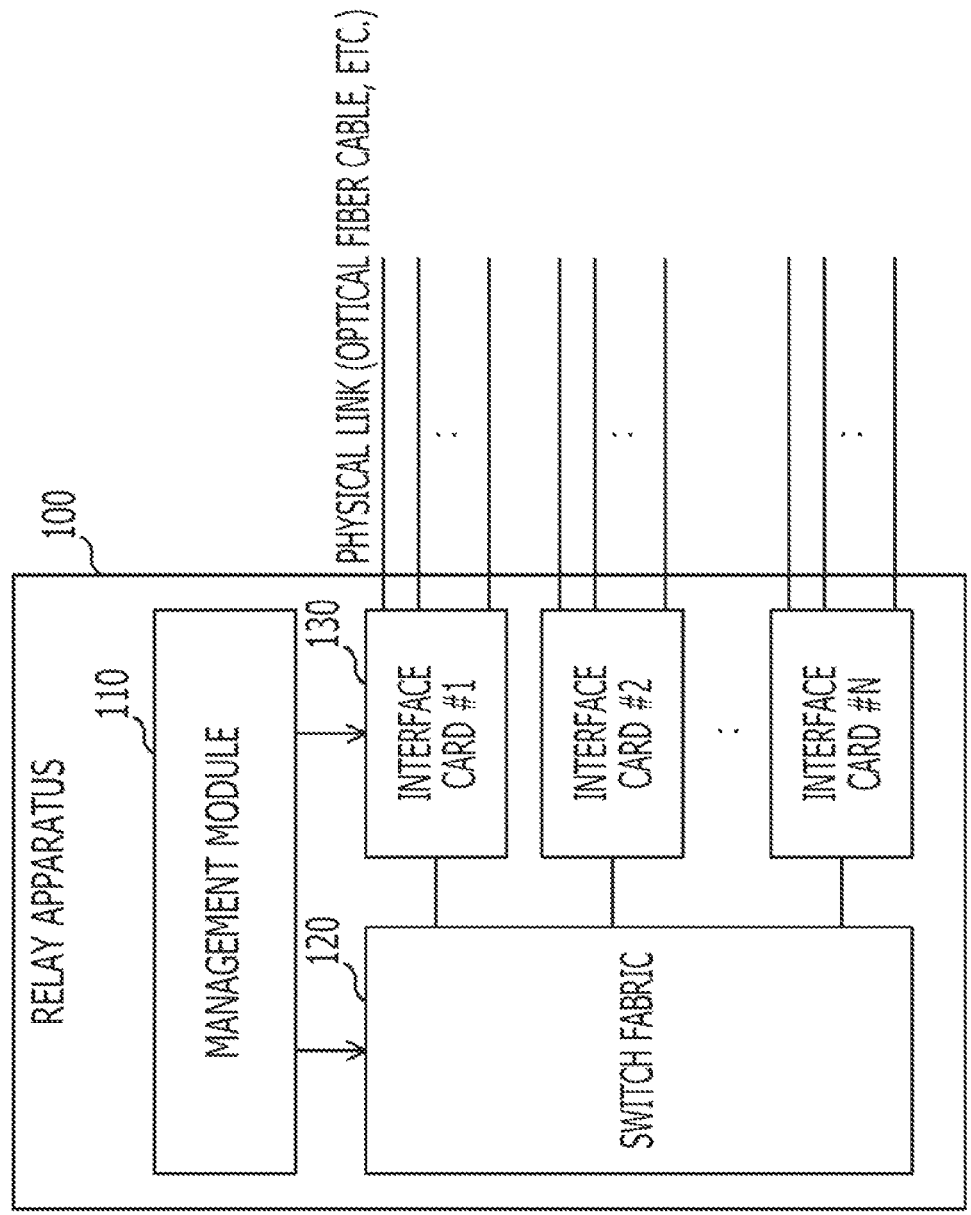
FIG. 1 illustrates an example of the hardware configuration of a relay apparatus.

FIG. 1 illustrates an example of the hardware configuration of a relay apparatus. A relay apparatus 100 is, for example, a chassis switch or router. The relay apparatus 100 includes a management module 110, a switch fabric 120, and multiple interface cards 130.

The management module 110 manages exchange of control information and states of the relay apparatus. The switch fabric 120 relays data exchanged between the interface cards 130. Each interface card 130 has a data input/output interface for connection to a physical link. The physical link is, for example, an optical fiber cable or a LAN (local area network) cable. The shaper is provided at the output side of the interface card 130.

Figure 2:
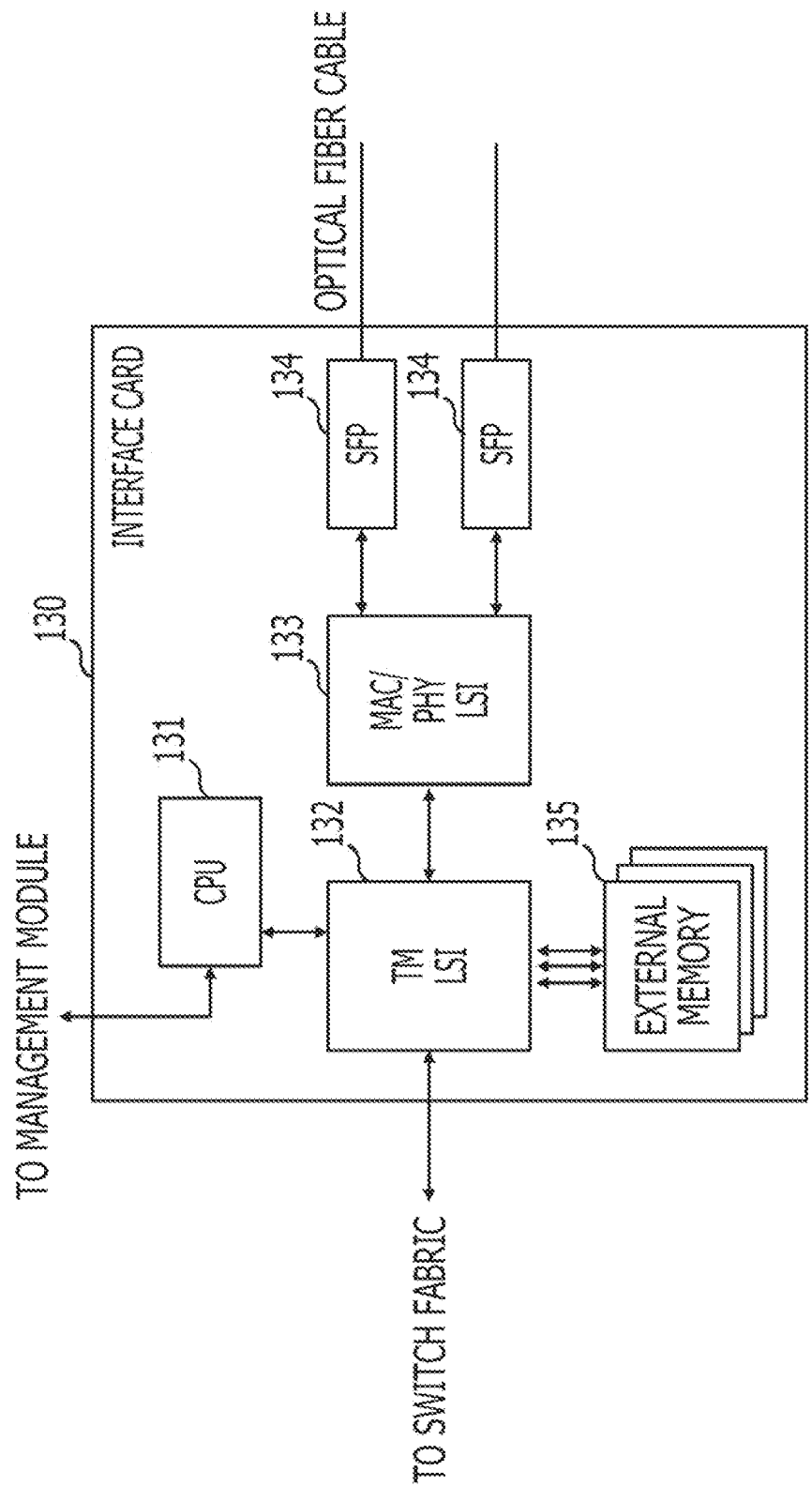
FIG. 2 illustrates an example of the configuration of an interface card.

FIG. 2 is a diagram illustrating an example of the configuration of the interface card. The interface card 130 includes a CPU (central processing unit) 131, a TM LSI (traffic management large scale integration) 132, a MAC/PHY LSI (Media Access Control/PHYsical LSI) 133, multiple SFP (small form factor pluggable) modules 134, and an external memory 135. Each SFP module 134 is an optical module to which an optical fiber cable is connected and performs conversion between an optical signal and an electrical signal. Instead of the optical module such as the SFP module 134, for example, it may be an interface to which an electrical-signal transmission cable, such as an RJ-45 cable, is connected.

The MAC/PHY LSI 133 performs processing between a physical layer, which is layer 1 of an OSI (open systems interconnection) reference model, and a MAC layer, which is one type of layer 2. More specifically, the MAC/PHY LSI 133 reconstructs a frame on the basis of an input signal (which is an electrical signal), removes a header from the frame, decapsulates the resulting frame into a packet, and outputs the packet to the TM LSI 132. For an output signal, the MAC/PHY LSI 133 adds a header to a packet to generate a frame, converts the frame into an electrical signal, and outputs the electrical signal to the SFP 134 module. The external memory 135 is, for example, a DRAM (dynamic random access memory) to provide an area for a buffer.

The TM LSI 132 performs traffic control in an upper layer that is layer 3 or higher in the OSI reference model and control regarding a QoS (Quality of Service). Examples of the QoS include policing, shaping, and priority control. The shaper that serves as a band control apparatus is one type of QoS realized by the TM LSI 132.

Figure 3:
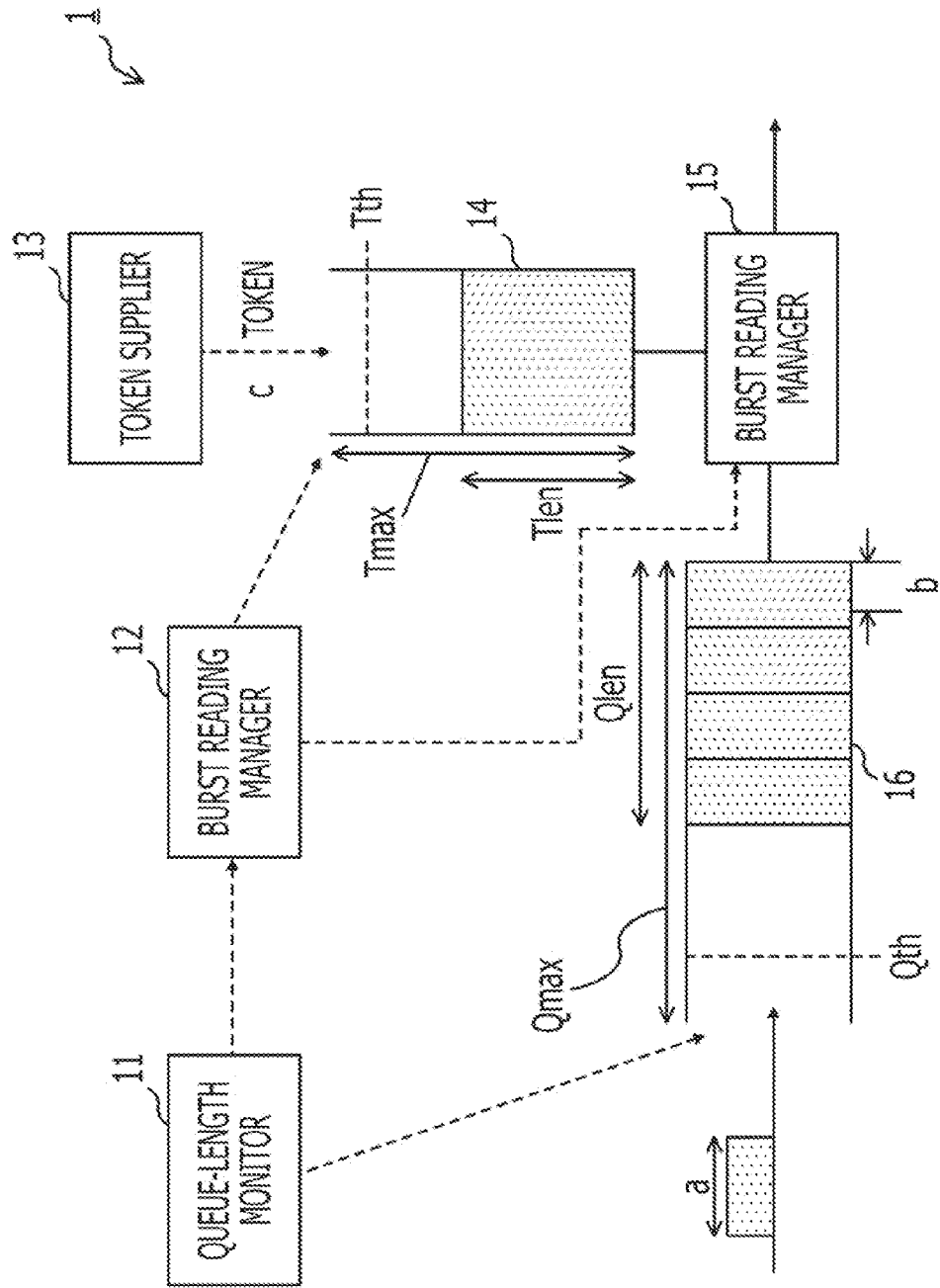
FIG. 3 illustrates an example of the configuration of a shaper.

FIG. 3 illustrates an example of the configuration of a shaper. A shaper 1 is, for example, one function of the TM LSI 132 illustrated in FIG. 2.

The shaper 1 includes a queue-length monitor 11, a burst reading manager 12, a token supplier 13, a token bucket 14, a reading controller 15, and a buffer memory 16.

The token supplier 13 periodically supplies tokens, which represent a transmission right, to the token bucket 14. The tokens represent a transmission right for determining the data size of a packet permitted to be transmitted. For example, the data size of a packet permitted to be transmitted may be predetermined in units of bytes per token and the number of tokens supplied at a time may also be predetermined. That is, the amount of tokens supplied at a time by the token supplier 13 may be predetermined. In addition to periodically supplying tokens, the token supplier 13 may also supply tokens upon arrival of a packet.

The token bucket 14 holds the tokens supplied from the token supplier 13. When a packet is read from the buffer memory 16, tokens corresponding to the size of the packet are reduced from the token bucket 14.

A maximum value of a bucket size that can hold tokens and a token threshold may be preset for the token bucket 14. The token threshold is a threshold for determining whether or not reading of a packet from the buffer memory 16 is to be permitted. However, when it is determined that a burst is occurring, packets are read from the buffer memory 16 regardless of the token threshold, as long as tokens are held in the token bucket 14. A value that is smaller than or equal to the bucket size is set as the token threshold.

In FIG. 3, Tlen indicates the token remaining amount, Tth indicates the token threshold, and Tmax indicates the bucket size (the upper limit value of the token remaining amount). It is preferable that the token threshold Tth have a largest possible value. For example, the token threshold Tth may have a value that is equal to the bucket size Tmax of the token bucket 14.

The buffer memory 16 is provided in, for example, a work area in the external memory 135 illustrated in FIG. 2. The buffer memory 16 is a FIFO (first in, first out) queue in which packets input from the switch fabric 120 illustrated in FIG. 1 are temporarily held in the order of arrival and from which packets are read in the order of arrival. That is, the buffer memory 16 holds and outputs packets on a FIFO basis. A maximum value (a buffer size) of the queue length and a buffer threshold are set for the buffer memory 16. The buffer threshold is a threshold for determining whether or not a burst is occurring. When the queue length exceeds the buffer threshold, it is determined that a burst is occurring. In FIG. 3, Qlen indicates the queue length, Qth indicates the buffer threshold, and Qmax indicates the buffer size (the upper limit value of the queue length). It is preferable that the buffer threshold Qth have a largest possible value. For example, the buffer threshold Qth may have a value obtained by subtracting the size of one packet from the buffer size Qmax.

The queue-length monitor 11 monitors the size (the length) of the queue formed in the buffer memory 16 and periodically reports the relationship between the queue length Qlen and the buffer threshold Qth to the burst reading manager 12.

The burst reading manager 12 detects occurrence of a burst on the basis of the relationship between the queue length Qlen and the buffer threshold Qth, the relationship being reported from the queue-length monitor 11. Depending on whether or not a burst is occurring, the burst reading manager 12 performs different packet-reading control.

When the queue length Qlen is larger than or equal to the buffer threshold Qth, the burst reading manager 12 detects occurrence of a burst. When the occurrence of a burst is detected, the burst reading manager 12 determines that reading of packets from the buffer memory 16 is to be performed until the queue length Qlen becomes smaller than the buffer threshold Qth or a permissible limit of the token remaining amount Tlen is reached, in order to prevent packet discarding.

When the queue length Qlen is smaller than the buffer threshold Qth, the burst reading manager 12 does not detect occurrence of a burst. When occurrence of a burst is not detected, the burst reading manager 12 determines that reading of packets from the buffer memory 16 is to be performed, as long as tokens corresponding to the token threshold Tth are reserved, i.e., the token remaining amount Tlen is larger than or equal to the token threshold Tth. When occurrence of a burst is not detected, the burst reading manager 12 does not permit reading of packets from the buffer memory 16, unless the token remaining amount Tlen is larger than or equal to the token threshold Tth. Upon determining that packets are to be read, the burst reading manager 12 issues a packet-reading instruction to the reading controller 15.

Upon receiving the packet-reading instruction from the burst reading manager 12, the reading controller 15 causes packets held in the buffer memory 16 to be read in sequence with a first one of the packets first. In conjunction with reading the packets from the buffer memory 16, the reading controller 15 reduces, from the token bucket 14, tokens corresponding to the size of the read packets. The packets read by the reading controller 15 are output to, for example, the MAC/PHY LSI 133 illustrated in FIG. 2.

The shaper 1 corresponds to a band control apparatus. The packets correspond to data units. The token bucket 14 corresponds to a counter manager. The total value of tokens held in the token bucket 14 corresponds to a counter value. The token threshold corresponds to a counter threshold. The burst reading manager 12 corresponds to a controller. The data units are not limited to packets and may be, for example, frames.

Figure 4:
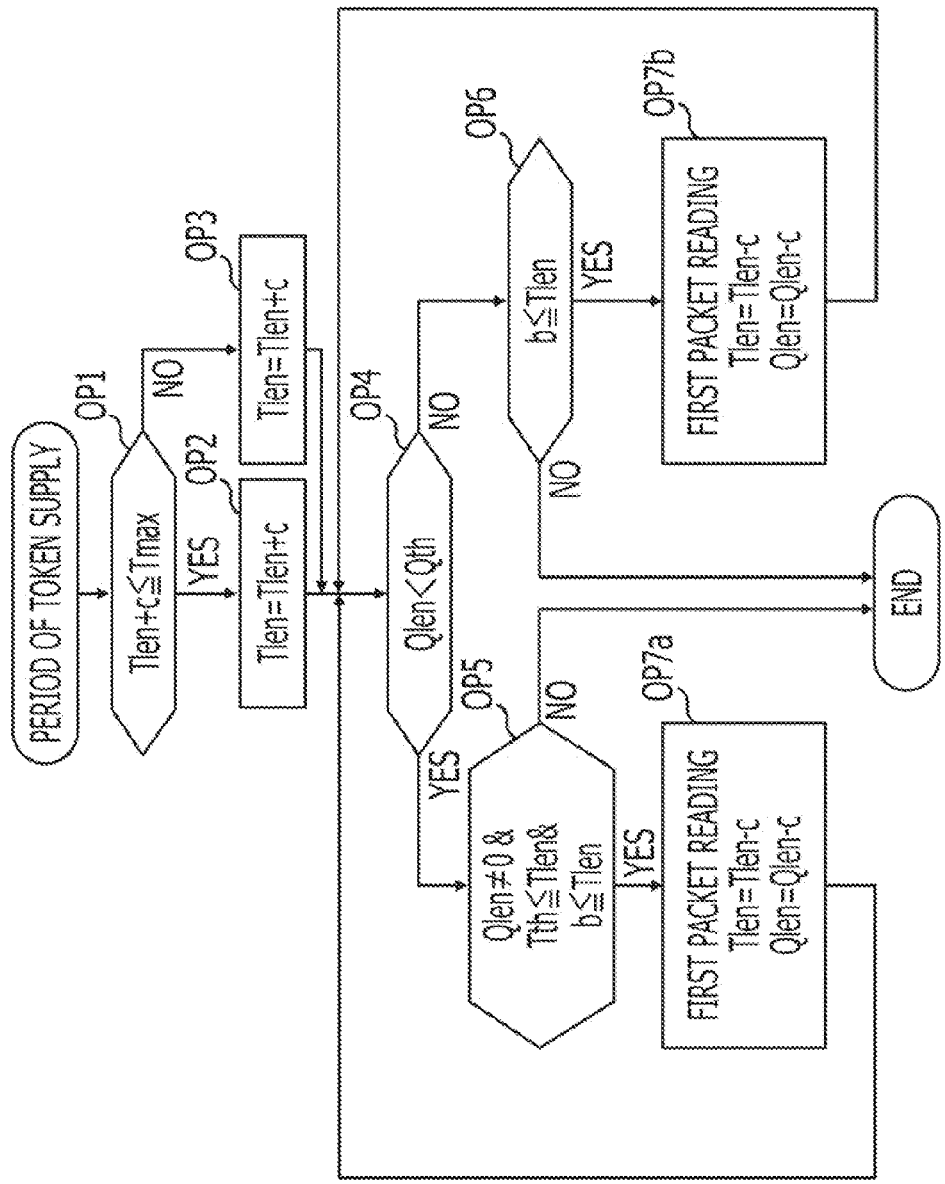
FIG. 4 illustrates an example of a flow of packet reading processing when tokens are supplied to a token bucket.

FIG. 4 illustrates an example of a flow of packet reading processing when tokens are supplied to the token bucket 14.

When the sum of the amount "c" of tokens supplied by the token supplier 13 and the token remaining amount Tlen is smaller than or equal to the bucket size Tmax (Yes in operation OP1), the token remaining amount Tlen does not reach the bucket size Tmax even when tokens having an amount corresponding to c are supplied. Thus, in operation OP2, the supplied tokens are accumulated in the token bucket 14 and the token remaining amount Tlen is updated to a value obtained by adding the amount "c" of the supplied tokens.

When the sum of the amount "c" of supplied tokens and the token remaining amount Tlen is larger than the bucket size (No in operation OP1), the token bucket 14 becomes full upon supply of tokens and thus tokens having an amount that is larger than or equal to the bucket size are not accumulated in the token bucket 14. Thus, in operation OP3, the token remaining amount Tlen reaches a value that is the same as the bucket size Tmax.

The burst reading manager 12 determines whether or not a burst is occurring. That is, in operation OP4, the burst reading manager 12 determines whether or not the queue length Qlen is smaller than the buffer threshold Qth. For the determination, the burst reading manager 12 uses the relationship between the queue length Qlen and the buffer threshold Qth, the relationship being reported from the queue-length monitor 11.

When the queue length Qlen is smaller than the buffer threshold Qth (Yes in operation OP4), the burst reading manager 12 does not detect occurrence of a burst. In this case, when the token remaining amount Tlen is larger than or equal to the token threshold Tth, packets are read from the buffer memory 16. In operation OP5, the burst reading manager 12 determines whether or not the token remaining amount Tlen of the token bucket 14 is larger than or equal to the token threshold Tth, whether or not the token remaining amount Tlen is larger than or equal to the size b of a first packet in the buffer memory 16, and whether or not any packet is held in the buffer memory 16.

When the token remaining amount Tlen is larger than or equal to the size b of the first packet in the buffer memory 16 and is larger than or equal to the token threshold Tth and any packet is held in the buffer memory 16 (Yes in operation OP5), the burst reading manager 12 determines that the first packet is to be read from the buffer memory 16. The burst reading manager 12 issues, to the reading controller 15, an instruction for reading the first packet in the buffer memory 16.

When the reading controller 15 receives the instruction for reading the first packet in the buffer memory 16, the process proceeds to operation OP7a. In operation OP7a, the reading controller 15 reduces, from the token bucket 14, tokens corresponding to the size b of the first packet and reads the first packet from the buffer memory 16. The token remaining amount Tlen becomes a value obtained by subtracting the size b of the read first packet. The queue length Qlen becomes a value obtained by subtracting the size b of the read first packet. Thereafter, the process returns to operation OP4. As long as the conditions in operations OP4 and OP5 are satisfied, the processing in operation OP7a is repeated and thus packets are read from the buffer memory 16.

When the token remaining amount Tlen is smaller than the token threshold Tth, when the token remaining amount Tlen is smaller than the size b of the first packet in the buffer memory 16, or when no packet is held in the buffer memory 16 (No in operation OP5), no packet is read from the buffer memory 16 and the processing ends.

When the queue length Qlen is larger than or equal to the buffer threshold Qth (No in operation OP4), the burst reading manager 12 detects occurrence of a burst. When occurrence of a burst is detected, packets are read from the buffer memory 16 regardless of the relationship between the token remaining amount Tlen and the token threshold Tth, in order to avoid packet discarding resulting from a buffer overflow. In operation OP6, the burst reading manager 12 determines whether or not tokens corresponding to the size b of the first packet in the buffer memory 16 are held in the token bucket 14. That is, the burst reading manager 12 determines whether or not the token remaining amount Tlen is larger than or equal to the size b of the first packet in the buffer memory 16.

When the token remaining amount Tlen is larger than or equal to the size b of the first packet in the buffer memory 16 (Yes in operation OP6), the burst reading manager 12 determines that the first packet in the buffer memory 16 is to be read. The burst reading manager 12 issues, to the reading controller 15, an instruction for reading the first packet in the buffer memory 16.

When the reading controller 15 receives the instruction for reading the first packet in the buffer memory 16, the process proceeds to operation OP7b. In operation OP7b, the reading controller 15 reduces, from the token bucket 14, tokens corresponding to the size b of the first packet and reads the first packet from the buffer memory 16. The token remaining amount Tlen becomes a value obtained by subtracting the size b of the read first packet. The queue length Qlen becomes a value obtained by subtracting the size b of the read first packet. Thereafter, the process returns to operation OP4.

When the token remaining amount Tlen is smaller than the size b of the first packet in the buffer memory 16 (No in operation OP6), this means that the tokens are depleted. Thus, no packet is read from the buffer memory 16 and the processing ends.

When the condition in operation OP4 is not satisfied, that is, when occurrence of a burst is detected, packets are read from the buffer memory 16, regardless of whether or not the token remaining amount Tlen is larger than or equal to the token threshold Tth. When packets are read and the queue length Qlen falls below the buffer threshold Qth (Yes in operation OP4), it is regarded that a burst has stopped and the processing in operations OP5 and OP7a is performed. Subsequently, when the token remaining amount Tlen falls below the token threshold Tth as a result of packet reading (No in operation OP5), the processing ends.

On the other hand, when a burst does not stop (No in operation OP4) after packet reading through repeated processing in operation OP7b and the token remaining amount Tlen decreases to zero (No in operation OP6), no packet can be read from the buffer memory 16 and thus the processing ends.

Figure 5:
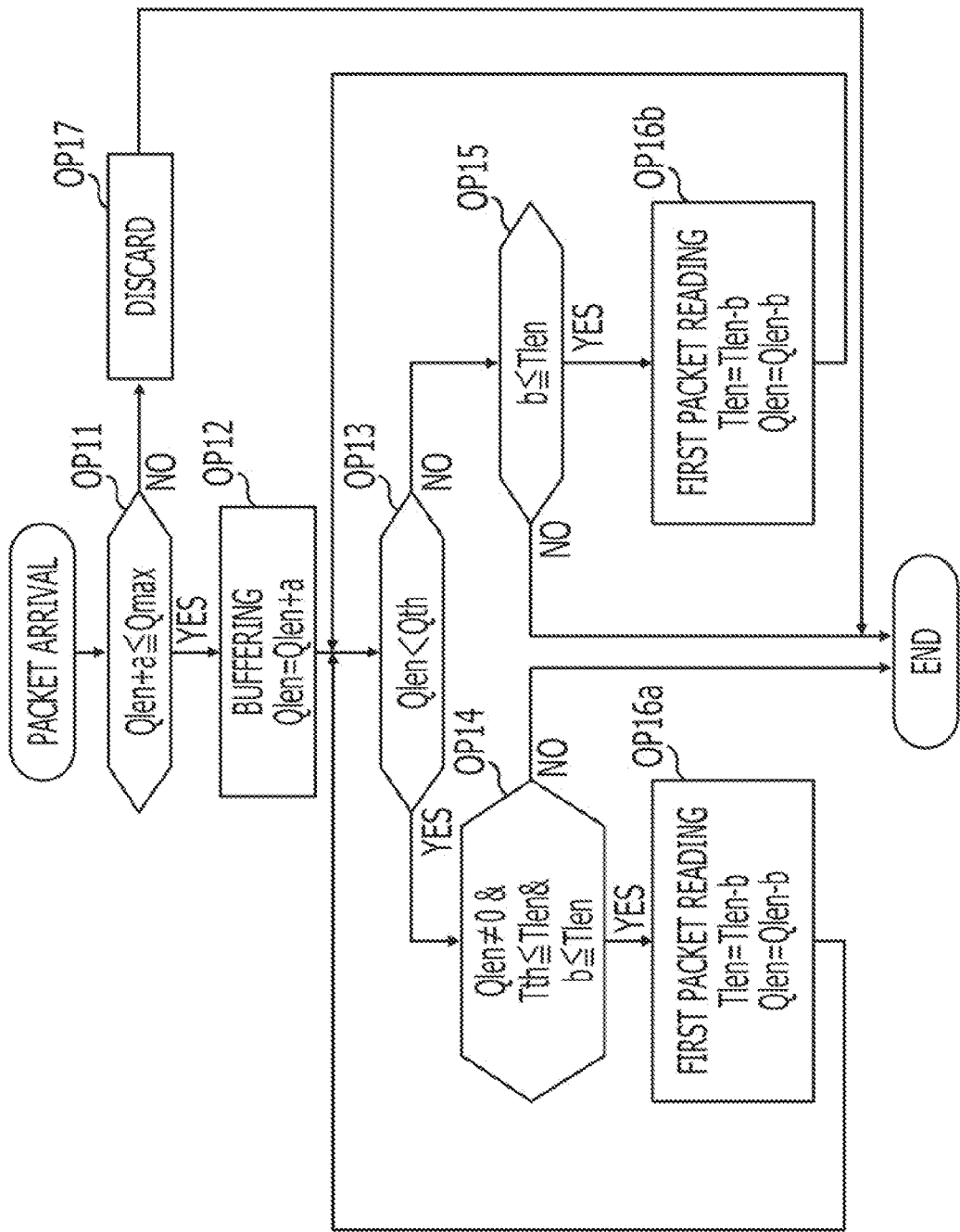
FIG. 5 illustrates an example of a flow of packet reading processing when a packet arrives at the shaper.

FIG. 5 illustrates an example of a flow of packet reading processing when a packet arrives at the shaper 1. The size of a packet that arrives at the shaper 1 is assumed to be a.

When the sum of the size a of the arrived packet and the current queue length Qlen is larger than the buffer size Qmax (No in operation OP11), a buffer overflow occurs and thus the arrived packet is discarded in operation OP17.

When the sum of the size a of the arrived packet and the current queue length Qlen is smaller than or equal to the buffer size Qmax (Yes in operation OP11), the arrived packet is stored (buffered) in the buffer memory 16 in operation OP12. The queue length Qlen becomes a value obtained by adding the size a of the arrived packet. Thereafter, the queue-length monitor 11 reports the relationship between the queue length Qlen and the buffer threshold Qth to the burst reading manager 12.

In operation OP13, the burst reading manager 12 determines whether or not the queue length Qlen is smaller than the buffer threshold Qth. That is, the burst reading manager 12 determines whether or not a burst is occurring.

When the queue length Qlen is smaller than the buffer threshold Qth (Yes in operation OP13), no burst is detected. When the token remaining amount Tlen of the token bucket 14 is larger than or equal to the token threshold Tth, packet reading from buffer memory 16 is permitted. In operation OP14, the burst reading manager 12 determines whether or not the token remaining amount Tlen is larger than or equal to the token threshold Tth, whether or not the token remaining amount Tlen is larger than or equal to the size b of a first packet in the buffer memory 16, and whether or not any packet is held in the buffer memory 16.

When the token remaining amount Tlen is larger than or equal to the size b of the first packet in the buffer memory 16 and is larger than or equal to the token threshold Tth and any packet is held in the buffer memory 16 (Yes in operation OP14), the burst reading manager 12 determines that the first packet in the buffer memory 16 is to be read. The burst reading manager 12 issues, to the reading controller 15, an instruction for reading the first packet in the buffer memory 16.

When the reading controller 15 receives the instruction for reading the first packet in the buffer memory 16, the process proceeds to operation OP16a. In operation OP16a, the reading controller 15 reduces, from the token bucket 14, tokens corresponding to the size b of the first packet and reads the first packet from the buffer memory 16. The token remaining amount Tlen becomes a value obtained by subtracting the size b of the read first packet. The queue length Qlen becomes a value obtained by subtracting the size b of the read first packet. Thereafter, the process returns to operation OP13. As long as the conditions in operations OP13 and OP14 are satisfied, the processing in operation OP16a is repeated and thus packets are read from the buffer memory 16. When only the arrived packet is held in the buffer memory 16, i.e., when the arrived packet is the first packet, the arrived packet is read and the size a of the arrived packet is reduced from the token remaining amount Tlen.

When the token remaining amount Tlen is smaller than the token threshold Tth, when the token remaining amount Tlen is smaller than the size b of the first packet in the buffer memory 16, or when no packet is held in the buffer memory 16 (No in operation OP14), no packet is read from the buffer memory 16 and the processing ends.

When the queue length Qlen is larger than or equal to the buffer threshold Qth (No in operation OP13), the burst reading manager 12 detects occurrence of a burst. When occurrence of a burst is detected, packets are read from the buffer memory 16 regardless of the relationship between the token remaining amount Tlen and the token threshold Tth, in order to avoid packet discarding resulting from a buffer overflow. In operation OP15, the burst reading manager 12 determines whether or not tokens corresponding to the size b of the first packet in the buffer memory 16 are held in the token bucket 14. That is, the burst reading manager 12 determines whether or not the token remaining amount Tlen is larger than or equal to the size b of the first packet in the buffer memory 16.

When the token remaining amount Tlen is larger than or equal to the size b of the first packet in the buffer memory 16 (Yes in operation OP15), the burst reading manager 12 determines that the first packet in the buffer memory 16 is to be read. The burst reading manager 12 issues, to the reading controller 15, an instruction for reading the first packet in the buffer memory 16.

When the reading controller 15 receives the instruction for reading the first packet in the buffer memory 16, the process proceeds to operation OP16b. In operation OP16b, the reading controller 15 reduces, from the token bucket 14, tokens corresponding to the size b of the first packet and reads the first packet from the buffer memory 16. The token remaining amount Tlen becomes a value obtained by subtracting the size b of the read first packet. The queue length Qlen becomes a value obtained by subtracting the size b of the read first packet. Thereafter, the process returns to operation OP13. When the condition in operation OP13 is not satisfied, i.e., a burst is occurring, and when the token remaining amount Tlen is larger than or equal to the size b of the first packet (Yes in operation OP15), the processing in operation OP16b is repeated and thus packets are read from the buffer memory 16.

When the token remaining amount Tlen is smaller than the size b of the first packet in the buffer memory 16 (No in operation OP15), this indicates that the tokens are depleted. Thus, no packet is read from the buffer memory 16 and the processing ends.

When the condition in operation OP13 is not satisfied, i.e., when a burst is occurring, the processing in operation OP16b is repeated and packets are read from the buffer memory 16 until the tokens are depleted (Yes in operation OP15). When packets are read and the queue length Qlen falls below the buffer threshold Qth (Yes in operation OP13), the processing in operations OP14 and OP16a is performed. Subsequently, when the token remaining amount Tlen falls below the token threshold Tth (No in operation OP14) as a result of packet reading, the processing ends.

In FIGS. 4 and 5, when a burst is detected in the shaper 1, packets are read until at least the queue length Qlen falls below the buffer threshold Qth or until the tokens are depleted. When a burst is not detected, packets are read until the token remaining amount Tlen falls below the token threshold Tth, until the token remaining amount Tlen falls below the size b of the first packet in the buffer memory 16, or until the packets held in the buffer memory 16 are depleted.

FIGS. 6A, 6B, 6C, 6D, and 6E illustrate an example when traffic of another burst arrives when the shaper 1 according to the first embodiment is in an equilibrium state. FIGS. 6A, 6B, 6C, 6D, and 6E correspond to FIGS. 18A, 18B, 18C, 18D, and 18E, respectively. In 6A, 6B, 6C, 6D, and 6E, graphs of the token remaining amount of the token bucket are schematically depicted in the extra illustrations. In the graphs, the horizontal axis indicates time and the vertical axis indicates the token remaining amount. The solid line indicates the token remaining amount of the shaper 1 according to the first embodiment and the dotted line indicates the token remaining amount of the shaper P1 (FIG. 14). That is, the dotted line corresponds to the token remaining amount of the token bucket illustrated in FIGS. 18A, 18B, 18C, 18D, and 18E. It is assumed that, in FIGS. 6A, 6B, 6C, 6D, and 6E, the token threshold Tth is set to the value of the bucket size Tmax of the token bucket 14. In FIGS. 6A, 6B, 6C, 6D, and 6E, all of the sizes of the arrived packets are assumed to be the same, for simplicity of description.

(1) Tokens corresponding to the bucket size Tmax are accumulated in the token bucket 14. It is assumed that TCP traffic arrives at the shaper at an input rate that is higher than the shaping rate (in FIG. 6A).

(2) At the shaper 1, since tokens corresponding to the token threshold Tth are accumulated in the token bucket 14, packets are read. When the packets are read, the tokens are reduced from the token bucket 14 by an amount corresponding to the size of the read packets. While the token remaining amount Tlen is smaller than the token threshold Tth, no packet is read from the buffer memory 16 (see FIG. 5) and the arrived packets form a queue (FIG. 6B). When the token remaining amount Tlen reaches the token threshold Tth again, the first packet is read from the buffer memory 16. In this case, the packet is read at a rate at which the tokens are supplied, i.e., at a rate corresponding to the shaping rate. In the shaper P1, on the other hand, packets are read until the tokens are depleted, as illustrated in FIG. 18B.

(3) Since the RTT increases as a result of formation of the queue, the input rate decreases after a while and the equilibrium state is reached (in FIG. 6C). When the shaper 1 is in the equilibrium state, the token remaining amount Tlen fluctuates in the vicinity of the token threshold Tth. Thus, sufficient tokens remain in the token bucket 14 in the shaper 1. On the other hand, in the token bucket P14 in the token bucket shaper P1 illustrated in FIG. 18C, the token remaining amount Tlen fluctuates between the state in which the tokens are depleted and the state in which the tokens are not depleted.

(4) It is assumed that burst traffic belonging to a TCP communication that is different from the TCP flow in the equilibrium state arrives (in FIG. 6D).

(5) Since packet reading from the shaper having a flow in the equilibrium state is performed only at the shaping rate, packets that arrive are accumulated in the buffer memory one after another. In the shaper 1, when the queue length Qlen reaches the buffer threshold Qth, packets are read from the buffer memory 16 (i.e., the burst is sent out), regardless of the relationship between the token threshold Tth and the token remaining amount Tlen. Consequently, free space is created in the buffer memory 16. In the shaper 1, since the free space in the buffer memory 16 increases, packets of a burst that arrives next time are allowed and thus discarding of the packets can be avoided (in FIG. 6E). On the other hand, in the shaper P1, since sufficient tokens do not exist when the equilibrium state is reached, as illustrated in FIG. 18E, the arrived burst induces a buffer overflow and thus the packets are discarded.

In the shaper 1, when the tokens are depleted as a result of sending out of the burst, the same state as the state illustrated in FIG. 18E is reached. However, since the time taken until the state of a buffer overflow is reached can be delayed, the packet discarding can be reduced compared to the shaper P1.

When a TCP burst occurs in the shaper P1 illustrated in FIG. 18E while another TCP flow is in the equilibrium state, a buffer overflow occurs soon and thus packets are discarded, since the token remaining amount in the shaper P1 is not sufficient. In contrast, in the shaper 1 according to the first embodiment, the flow reaches the equilibrium state more quickly than the shaper P1 because of the setting of the token threshold Tth and the token remaining amount Tlen fluctuates in the vicinity of the token threshold Tth. This increases the possibility that tokens that are sufficient to read packets from the buffer memory 16 remain in the shaper 1 at a point in time when the queue length Qlen exceeds the buffer threshold Qth. The shaper 1 reads packets when the queue length Qlen exceeds the buffer threshold Qth, i.e., when a burst is detected. Thus, it is possible to create free space in the buffer memory 16, thus making it possible delay a buffer overflow. By delaying a buffer overflow, the shaper 1 can reduce packet discarding.

For example, when the buffer threshold Qth is a value obtained by subtracting the size of one packet from the buffer size Qmax and the token threshold Tth is equal to the packet size Tmax, execution of burst reading can be suppressed during the transition state until the equilibrium state is reached. In the equilibrium state, it is possible to maximize the burst tolerance of the shaper 1.

Second Embodiment

In the second embodiment, multiple token thresholds and multiple buffer thresholds are set and packet reading processing is executed based on the relationships between the token remaining amount and the token thresholds and the relationships between the queue length and the buffer thresholds. In the second embodiment, only portions that are different from those in the first embodiment are described and descriptions of common portions are not provided for the sake of brevity.

Figure 7:
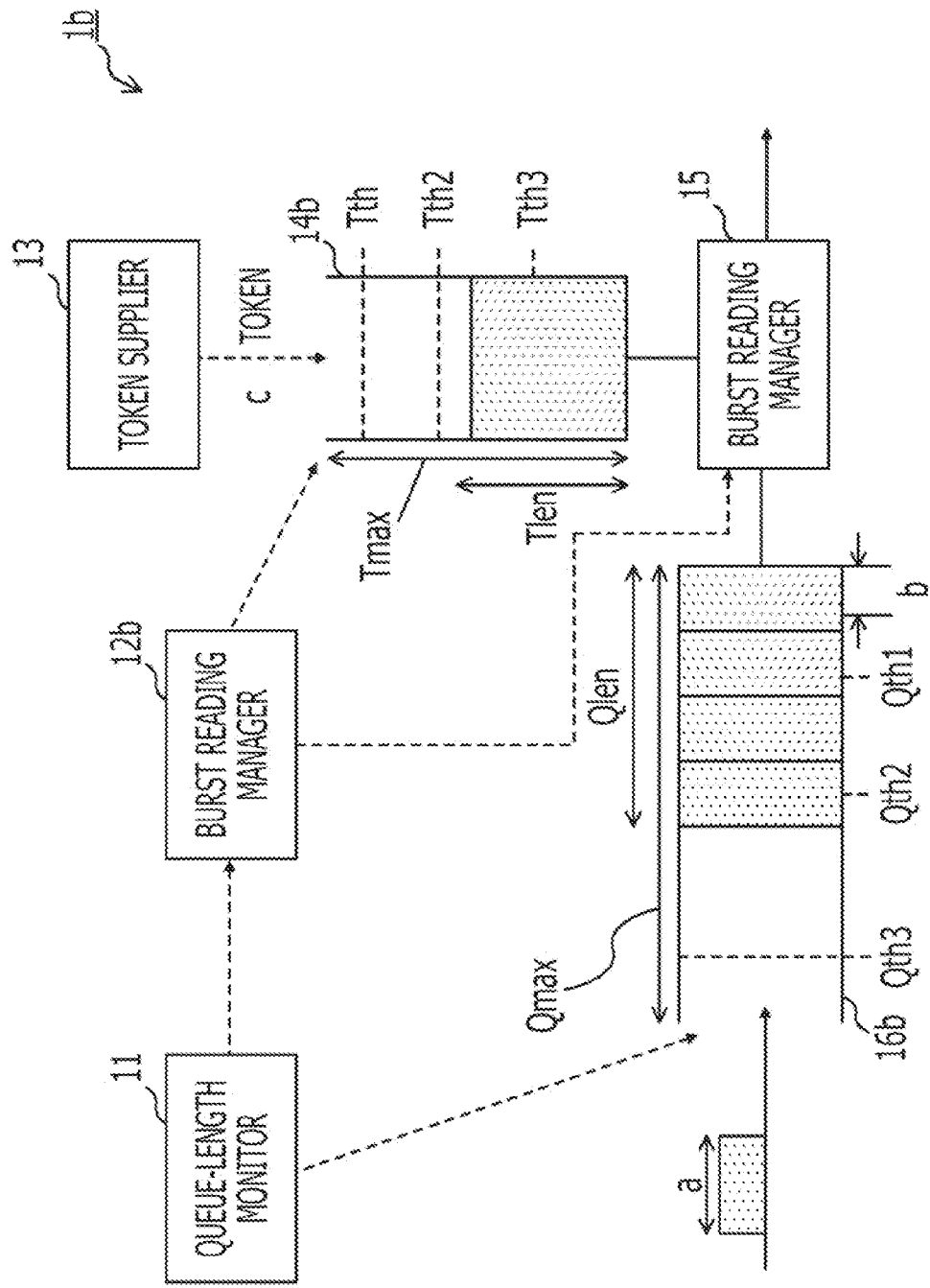
FIG. 7 illustrates an example of the configuration of a shaper.

FIG. 7 is a block diagram of an example of the configuration of a shaper according to a second embodiment. A shaper 1b includes a queue-length monitor 11, a burst reading manager 12b, a token supplier 13, a token bucket 14b, a reading controller 15, and a buffer memory 16b.

A first token threshold Tth1, a second token threshold Tth2, and a third token threshold Tth3 are set for the token bucket 14b. The token thresholds have a relationship expressed by: 0<Third Token Threshold Tth3<Second Token Threshold Tth2<First Token Threshold Tth1≤Token Bucket Size Tmax.

A first buffer threshold Qth1, a second buffer threshold Qth2, and a third buffer threshold Qth3 are set for the buffer memory 16b. The buffer thresholds have a relationship expressed by: 0<First Buffer Threshold Qth1<Second Buffer Threshold Qth2<Third Buffer Threshold Qth3<Buffer Size Qmax.

The burst reading manager 12b determines whether or not a packet is to be read from the buffer memory 16b, on the basis of the relationships between the queue length Qlen and the buffer thresholds Qth1 to Qth3 and the relationships between the token remaining amount Tlen and the token thresholds Tth1 to Tth3. More specifically, the burst reading manager 12b determines that a first packet is to be read from the buffer memory 16b, in the case of:

(1) 0<Qlen<Qth1, and Tth1≤Tlen,
(2) Qth1≤Qlen<Qth2, and Tth2≤Tlen,
(3) Qth2≤Qlen<Qth3, and Tth3≤Tlen, or
(4) Qth3≤Qlen, and First Packet Size b≤Tlen.

Figure 8:
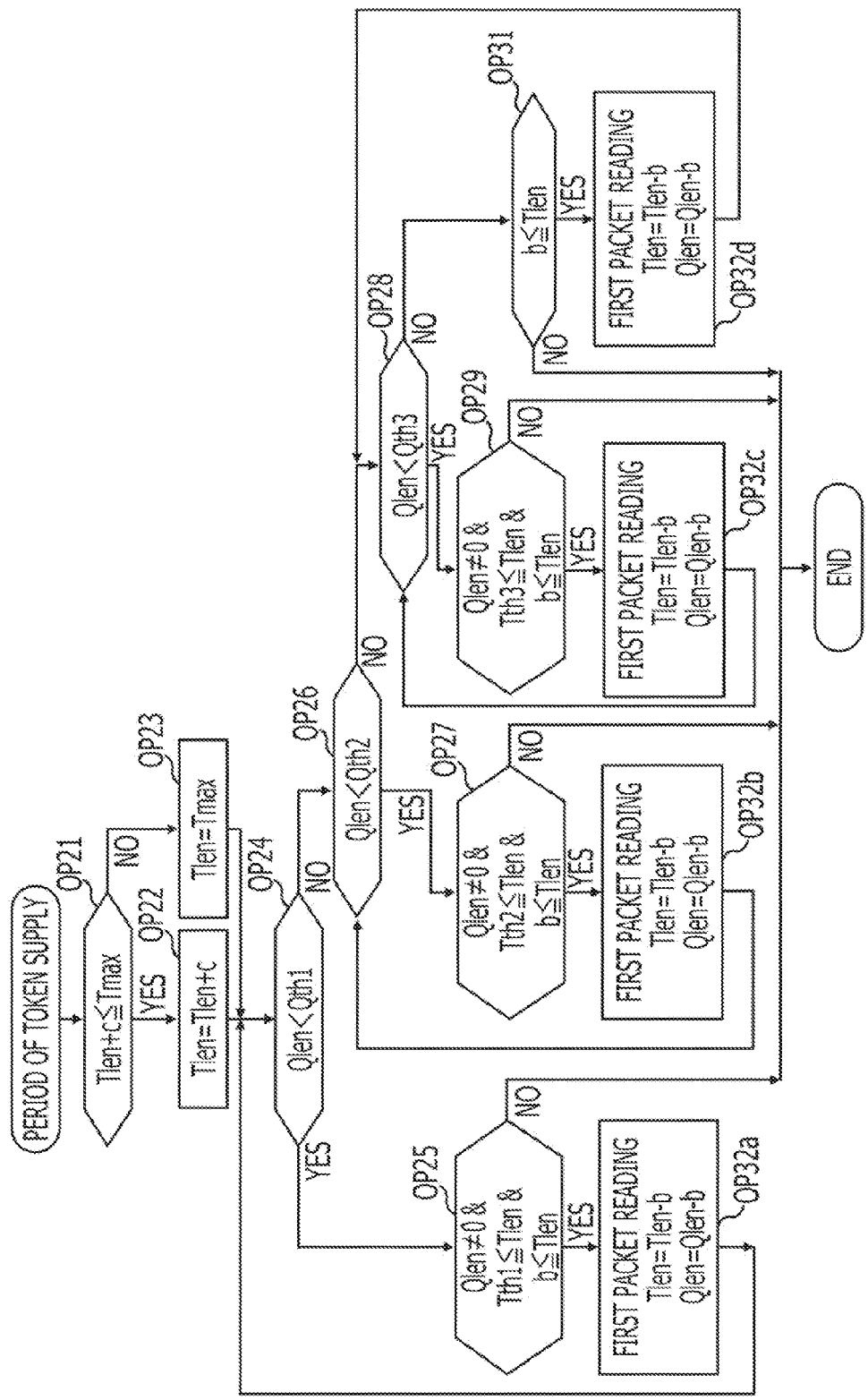
FIG. 8 illustrates an example of a flow of packet reading processing when tokens are supplied.

FIG. 8 illustrates an example of a flow of packet reading processing when tokens are supplied in the second embodiment. Since processing in operations OP21 to OP23 is substantially the same as the processing in operations OP1 to OP3 illustrated in FIG. 4, a description thereof is not given hereinafter.

In operation OP24, the burst reading manager 12b determines whether or not the queue length Qlen is smaller than the first buffer threshold Qth1.

When the queue length Qlen is smaller than the first buffer threshold Qth1 (Yes in operation OP24), the process proceeds to operation OP25. In operation OP25, the burst reading manager 12b determines whether or not the token remaining amount Tlen is larger than or equal to the first token threshold Tth1, whether or not the token remaining amount Tlen is larger than or equal to the size b of a first packet in the buffer memory 16b, and whether or not any packet is held in the buffer memory 16b.

When the token remaining amount Tlen is larger than or equal to the size b of the first packet in the buffer memory 16b and is larger than or equal to the first token threshold Tth1 and any packet is held in the buffer memory 16b (Yes in operation OP25), the burst reading manager 12b determines that the first packet is to be read from the buffer memory 16b. The burst reading manager 12b issues, to the reading controller 15, an instruction for reading the first packet in the buffer memory 16b.

When the reading controller 15 receives the instruction for reading the first packet in the buffer memory 16b, the process proceeds to operation OP32a. In operation OP32a, the reading controller 15 reduces, from the token bucket 14b, tokens corresponding to the size b of the first packet and reads the first packet from the buffer memory 16b. The token remaining amount Tlen becomes a value obtained by subtracting the size b of the read first packet. The queue length Qlen becomes a value obtained by subtracting the size b of the read first packet. Thereafter, the process returns to operation OP24, and as long as the conditions in operations OP24 and OP25 are satisfied, the processing in operation OP32a is repeated and thus packets are read.

When the token remaining amount Tlen is smaller than the first token threshold Tth1, when the token remaining amount Tlen is smaller than the size b of the first packet in the buffer memory 16b, or when no packet is held in the buffer memory 16b (No in operation OP25), no packet is read from the buffer memory 16b and the processing ends.

When the queue length Qlen is larger than or equal to the first buffer threshold Qth1 (No in operation OP24), the process proceeds to operation OP26 in which the burst reading manager 12b determines whether or not the queue length Qlen is larger than or equal to the first buffer threshold Qth1 and is smaller than the second buffer threshold Qth2.

When the queue length Qlen is larger than or equal to the first buffer threshold Qth1 and is smaller than the second buffer threshold Qth2 (Yes in operation OP26) and when the token remaining amount Tlen is larger than or equal to the second token threshold Tth2, it is determined that packet reading is to be performed. In operation OP27, the burst reading manager 12b determines whether or not the token remaining amount Tlen is larger than or equal to the second token threshold Tth2, whether or not the token remaining amount Tlen is larger than or equal to the size b of the first packet in the buffer memory 16b, and whether or not any packet is held in the buffer memory 16b.

When the token remaining amount Tlen is larger than or equal to the size b of the first packet in the buffer memory 16b and is larger than or equal to the second token threshold Tth2 and any packet is held in the buffer memory 16b (Yes in operation OP27), the burst reading manager 12b determines that the first packet in the buffer memory 16b is to be read. The burst reading manager 12b issues, to the reading controller 15, an instruction for reading the first packet in the buffer memory 16b. Thereafter, in operation OP32b, processing that is similar to the processing in operation OP32a is performed. Thereafter, the process returns to operation OP26, and as long as the conditions in operations OP26 and OP27 are satisfied, the processing in operation OP32b is repeated and thus packets are read.

When the token remaining amount Tlen is smaller than the second token threshold Tth2, when the token remaining amount Tlen is smaller than the size b of the first packet in the buffer memory 16b, or when no packet is held in the buffer memory 16b (No in operation OP27), no packet is read from the buffer memory 16b and the processing ends.

When the condition in operation OP26 is not satisfied (No in operation OP26), the process proceeds to operation in OP28 in which the burst reading manager 12b determines whether or not the queue length Qlen is larger than or equal to the second buffer threshold Qth2 and is smaller than the third buffer threshold Qth3.

When the queue length Qlen is larger than or equal to the second buffer threshold Qth2 and is smaller than the third buffer threshold Qth3 (Yes in operation OP28), it is determined that packet reading is to performed as long as the token remaining amount Tlen is larger than or equal to the third token threshold. In operation OP29, the burst reading manager 12b determines whether or not the token remaining amount Tlen is larger than or equal to the third token threshold Tth3, whether or not the token remaining amount Tlen is larger than or equal to the size b of the first packet in the buffer memory 16b, and whether or not any packet is held in the buffer memory 16b.

When the token remaining amount Tlen is larger than or equal to the size b of the first packet in the buffer memory 16b and is larger than or equal to the third token threshold Tth3 and any packet is held in the buffer memory 16b (Yes in operation OP29), the burst reading manager 12b determines that the first packet in the buffer memory 16b is to be read. The burst reading manager 12b issues, to the reading controller 15, an instruction for reading the first packet in the buffer memory 16b. In operation OP32c, processing that is similar to the processing in operation OP32a is performed. Thereafter, the process returns to operation OP28, and as long as the conditions in operations OP28 and OP29 are satisfied, the processing in operation OP32c is repeated and thus packets are read.

When the token remaining amount Tlen is smaller than the third token threshold Tth3, when the token remaining amount Tlen is smaller than the size b of the first packet in the buffer memory 16b, or when no packet is held in the buffer memory 16b (No in operation OP29), no packet is read from the buffer memory 16b and the processing ends.

When the queue length Qlen is larger than or equal to the third buffer threshold Qth3 (No in operation OP28), the burst reading manager 12b detects a burst. When a burst is detected, packets are read from the buffer memory 16b, regardless of the relationships between the token remaining amount Tlen and the token thresholds. In operation OP31, the burst reading manager 12b determines whether or not the token remaining amount Tlen is larger than or equal to the size b of the first packet.

When the token remaining amount Tlen is larger than or equal to the size b of the first packet (Yes in operation OP31), the burst reading manager 12b determines that the first packet in the buffer memory 16b is to be read. The burst reading manager 12b issues, to the reading controller 15, an instruction for reading the first packet in the buffer memory 16b. In operation OP32d, processing that is similar to the processing in operation OP32a is performed. Thereafter, the process returns to operation OP28, and packets are read as long as the condition in operation OP28 is not satisfied and the condition in operation OP31 is satisfied.

When the token remaining amount Tlen is smaller than the size b of the first packet (No in operation OP31), this indicates that tokens that are sufficient to read the first packet are not accumulated in the token bucket 14b. Thus, no packet is read from the buffer memory 16b and the processing ends.

Figure 9:
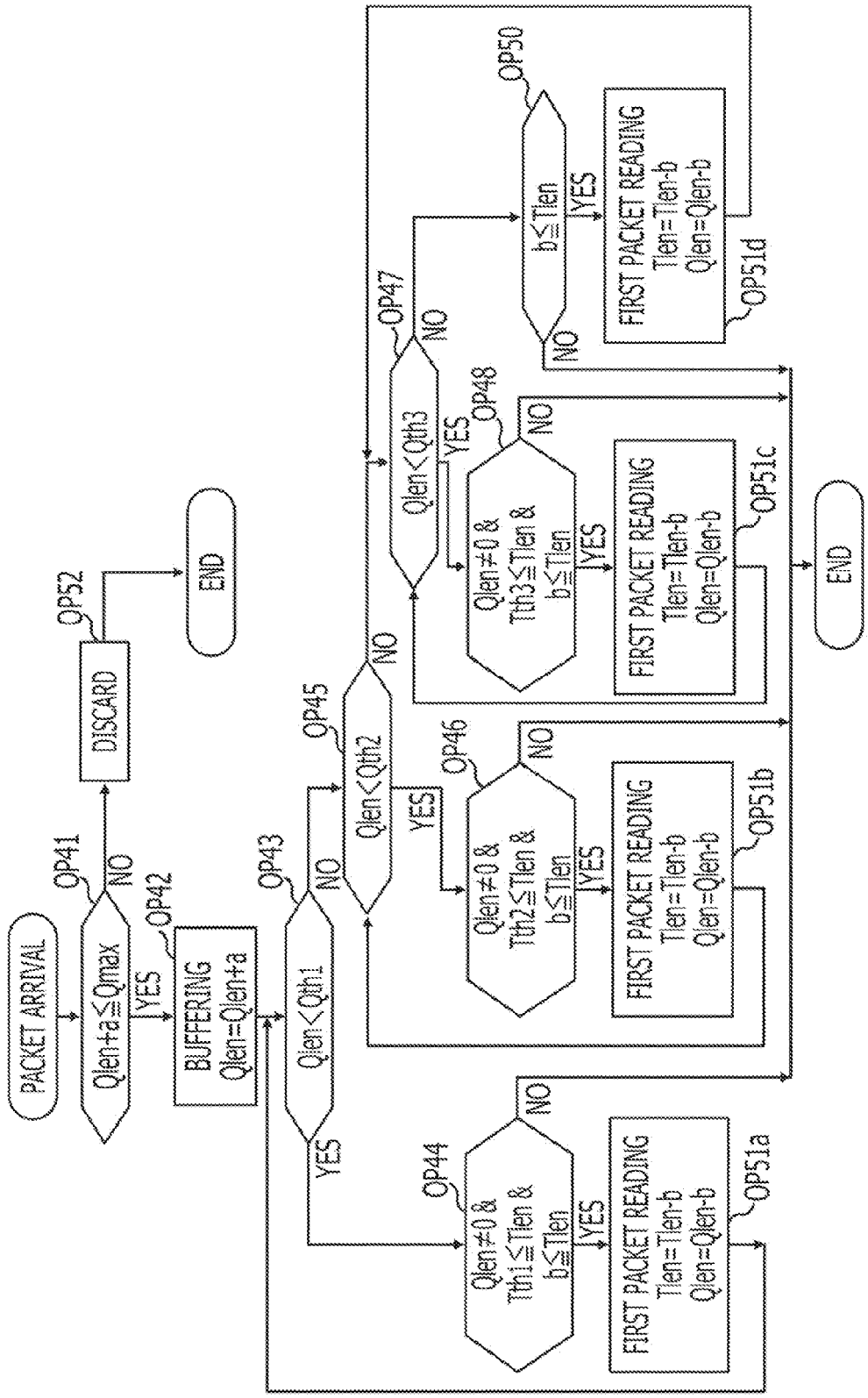
FIG. 9 illustrates an example of a flow of packet reading processing when a packet arrives.

FIG. 9 illustrates an example of a flow of packet reading processing when a packet arrives in the second embodiment. Processing, performed in operations OP41, OP42, and OP52 in FIG. 9, for determining whether or not a packet that arrives causes a buffer overflow is similar to the processing in operations OP11, OP12, and OP17 in FIG. 5, and thus a description thereof is not given hereinafter. Processing, performed in operation OP43 to OP51d in FIG. 9, for determining whether or not the first packet is to be read after the arrived packet is buffered is similar to the processing in operations OP24 to OP32d in FIG. 8, and thus a description thereof is not given hereinafter.

In FIGS. 8 and 9, when the queue length Qlen is larger than or equal to the (n−1)th buffer threshold and is smaller than the nth buffer threshold (where 0<n≤3), the shaper 1b reads a packet until the token remaining amount Tlen falls below the nth token threshold, until the token remaining amount Tlen falls below the size b of the first packet in the buffer memory 16b, or until the queue length Qlen falls below the (n−1)th buffer threshold. The third buffer threshold Qth3 is a threshold for detecting a burst. When the queue length Qlen exceeds the third buffer threshold Qth3, packets are read until the tokens are depleted or until the queue length Qlen falls below at least the third buffer threshold Qth3.

According to the shaper 1b of the second embodiment, since the multiple buffer thresholds and the multiple token thresholds are set, finer packet reading is possible. In particular, according to the above-described shaper 1 of the first embodiment, since all tokens held in the token bucket can be used at a point in time when the queue length Qlen exceeds the buffer threshold Qth, there is a possibility that a larger burst is sent out to an apparatus at a subsequent stage. On the other hand, according to the shaper 1b of the second embodiment, since use of the tokens is permitted in a stepwise manner on the basis of the buffer thresholds and the token thresholds, it is possible to suppress sending out of a burst to an apparatus at a subsequent stage.

Although an example in which three buffer thresholds and three token thresholds are set has been described in the second embodiment, the arrangement is not limited thereto. That is, two buffer thresholds and two token thresholds may be set or four or more buffer thresholds and four or more token thresholds may be set.

Third Embodiment

In the first and second embodiments, no consideration has been given to the rate of reading packets from the buffer memory, i.e., the output rate of the shaper. The output rate of the shaper varies in conjunction with the token remaining amount. Tokens are supplied at a token supply rate (the amount of tokens supplied in a predetermined period of time). In the initial setting, the token supply rate corresponds to the shaping rate. Accordingly, in the third embodiment, a shaper sets multiple rate control thresholds for the buffer memory and determines the token supply rate on the basis of the relationships between the queue length and the rate control thresholds. In the third embodiment, the shaper controls the token supply rate to thereby control the output rate of the shaper. In the third embodiment, only portions that are different from those in the first embodiment are described and descriptions of common portions are not given.

Figure 10:
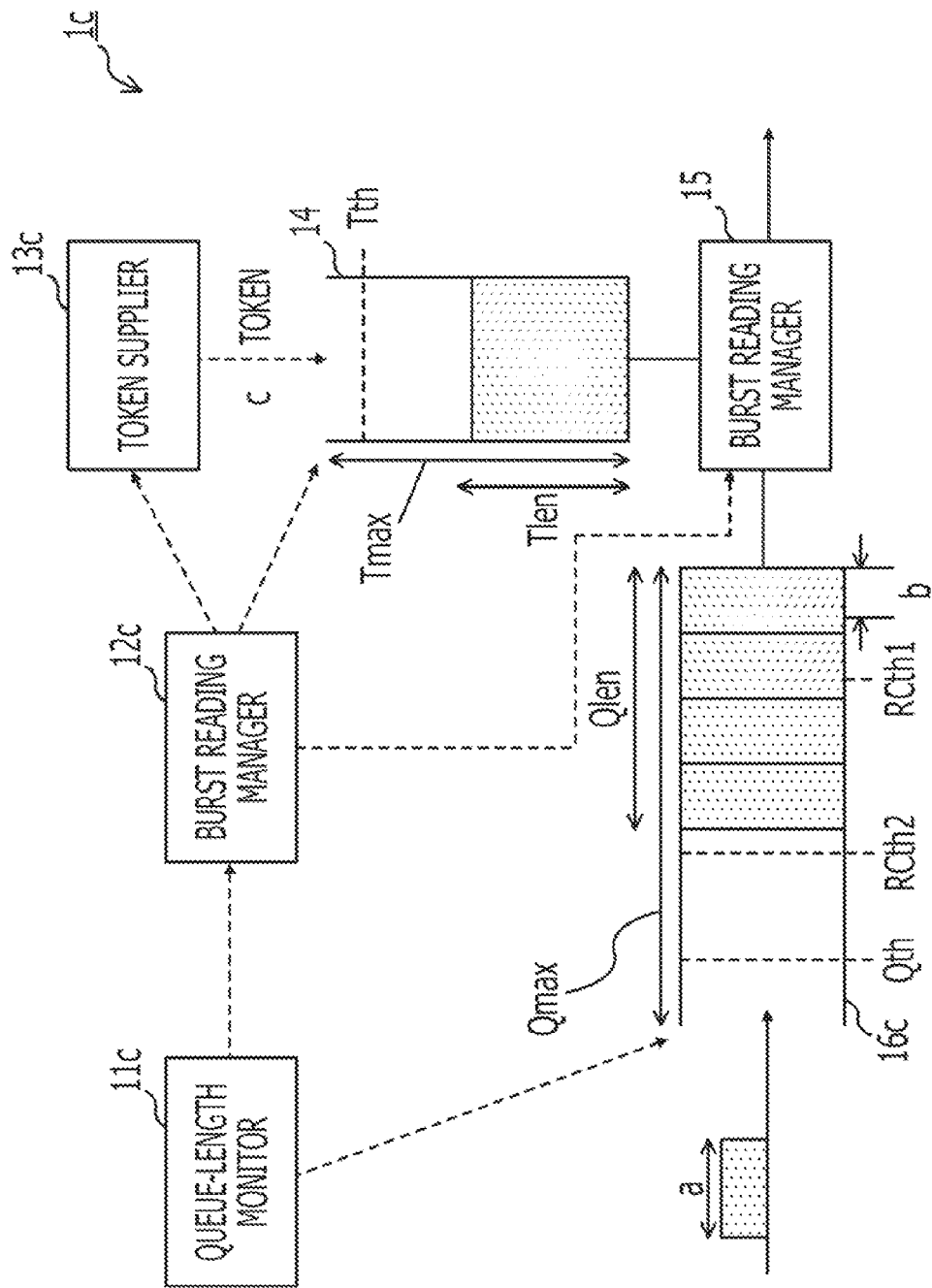
FIG. 10 illustrates an example of the configuration of a shaper.

FIG. 10 illustrates an example of the configuration of a shaper according to the third embodiment. A shaper $1c$ includes a queue-length monitor $11c$, a burst reading manager $12c$, a token supplier $13c$, a token bucket 14, a reading controller 15, and a buffer memory $16c$.

A first rate control threshold RCth1 and a second rate control threshold RCth2, which are thresholds for determining the token supply rate, are set for the buffer memory $16c$ in addition to the buffer threshold Qth. The control thresholds have a relationship expressed by: 0<First Rate Control Threshold RCth1<Second Rate Control Threshold RCth2<Buffer Threshold Qth.

The queue-length monitor $11c$ periodically reports the relationship of the queue length Qlen, the buffer threshold Qth, the first rate control threshold RCth1, and the second rate control threshold RCth2, which are set for the buffer memory $16c$, to the burst reading manager $12c$.

The burst reading manager $12c$ determines packets reading from the buffer memory $16c$, on the basis of the relationship between the queue length Qlen and the buffer threshold Qth, the relationship being reported from the queue-length monitor $11c$, and of the relationship between the token remaining amount Tlen and the token threshold Tth. The burst reading manager $12c$ issues a packet-reading instruction to the reading controller 15.

The burst reading manager $12c$ determines the token supply rate on the basis of the relationship of the queue length Qlen, the first rate control threshold RCth1, and the second rate control threshold RCth2, the relationship being reported from the queue-length monitor $11c$. The burst reading manager $12c$ issues, to the reading controller $13c$, an instruction indicating the determined token supply rate.

When the queue length is increasing, for example, when the queue length changes from a value that is smaller than the first rate control threshold RCth1 to a value that is larger than or equal to the first rate control threshold RCth1, the burst reading manager $12c$ sets the token supply rate to a smaller value than the shaping rate. Setting the token supply rate to a smaller value than the shaping rate reduces the speed of the increase in the token remaining amount. When the speed of the increase in the token remaining amount decreases, the speed at which the packets are read from the buffer memory $16c$ decreases and the output rate decreases. With the decreased output rate, when the input rate is higher than the shaping rate, the speed of the increase in the queue length increases. As a result of the increase in the queue length of the shaper $1c$, the RTT increases and the average output rate of the transmitting apparatus decreases. As a result of the decrease in the average output rate of the transmitting apparatus, the average input rate of the shaper $1c$ also decreases and the shaper $1c$ enters the equilibrium state. Thus, as a result of setting of the token supply rate to a smaller value than the shaping rate, the increase in the queue length is accelerated and the equilibrium state is reached more quickly.

However, when the token supply rate is smaller than the shaping rate, the possibility that a buffer overflow occurs increases since the increase in the queue length is accelerated. Thus, the burst reading manager $12c$ returns the token supply rate to the shaping rate at a point in time when the queue length reaches a certain degree of queue length, for example, reaches a length that is larger than or equal to the second rate control threshold RCth2.

When an instruction for reducing the token supply rate to a smaller rate than the shaping rate is received from the burst reading manager $12c$, the token supplier $13c$ changes the token supply rate to a preset rate that is lower than the shaping rate. For example, the token supplier $13c$ reduces the token supply rate by reducing the amount of tokens supplied to the token bucket 14 at a time. For example, the token supplier $13c$ reduces the token supply rate by reducing the period of time in which the tokens are supplied.

Figure 11:
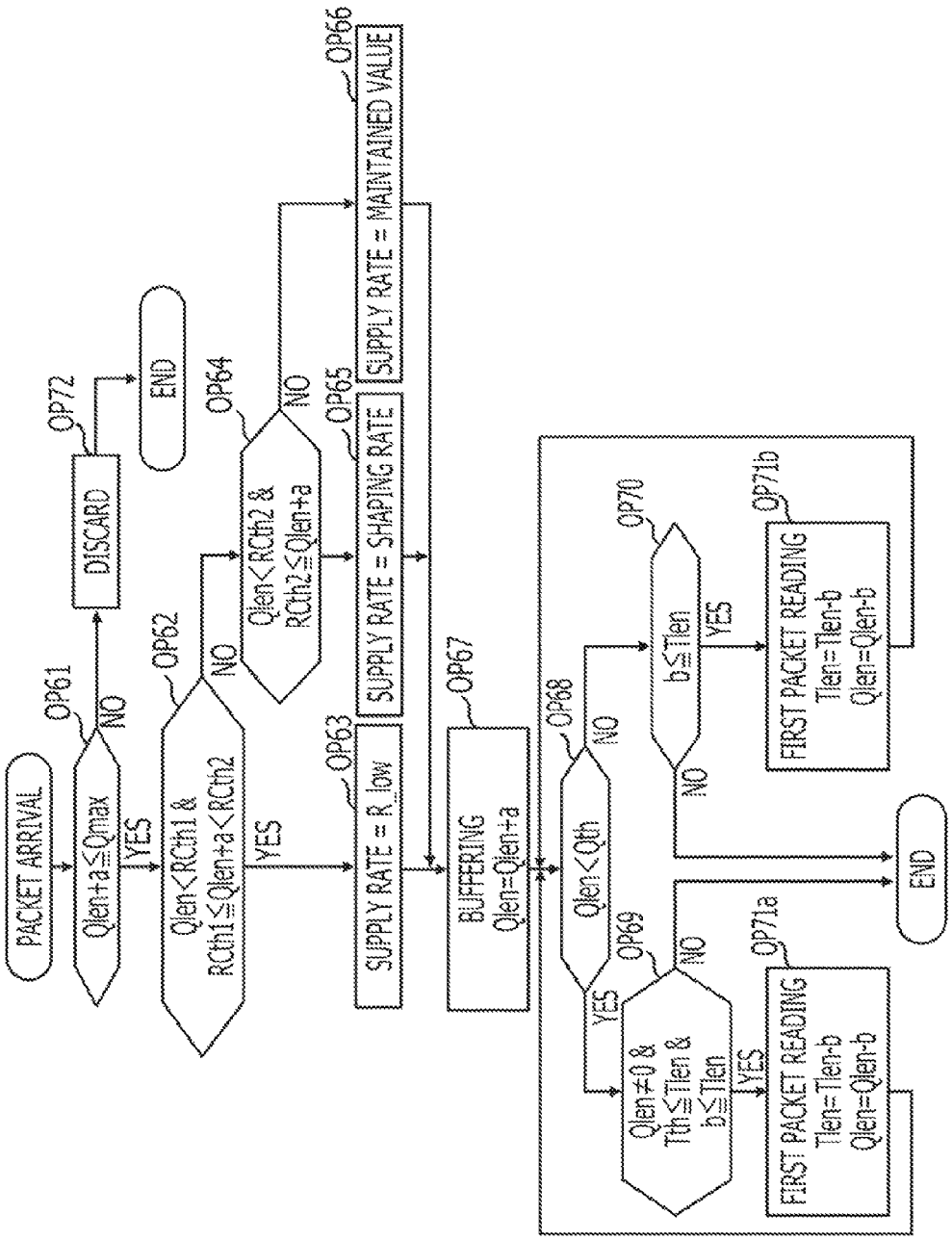
FIG. 11 illustrates an example of a flow of packet reading processing and token-supply-rate determination processing when a packet arrives at the shaper.

FIG. 11 illustrates an example of a flow of packet reading processing and token-supply-rate determination processing when a packet arrives at the shaper $1c$. The size of a packet that arrives at the shaper $1c$ is assumed to be a. In FIG. 11, the token supply rate is simply indicated as "supply rate".

When the sum of the size a of the arrived packet and the queue length Qlen is larger than the buffer size Qmax (No in operation OP61), a buffer overflow occurs and thus the arrived packet is discarded in operation OP72.

When the sum of the size a of the arrived packet and the queue length Qlen is smaller than or equal to the buffer size Qmax (Yes in operation OP61), the burst reading manager $12c$ determines whether or not buffering of the arrived packet causes the queue length to change to a value that is larger than or equal to the first rate control threshold. That is, in operation OP62, the burst reading manager $12c$ determines whether or not the queue length Qlen before the buffering is smaller than the first rate control threshold RCth1 and the queue length Qlen+a after the buffering is larger than or equal to the first rate control threshold RCth1 and is smaller than the second rate control threshold RCth2. It is assumed that the burst reading manager $12c$ can maintain the queue length before the buffering of the arrived packet.

When the condition in operation OP62 is satisfied (Yes in operation OP62), this indicates the buffering of the arrived packet causes the queue length to change from a value that is smaller than the first rate control threshold RCth1 to a value that is larger than or equal to the first rate control threshold RCth1. In this case, in operation OP63, the burst reading manager $12c$ determines the token supply rate to be a rate R_low that is lower than the predetermined shaping rate. The burst reading manager $12c$ issues, to the token supplier $13c$, an instruction for setting the token supply rate to the determined rate (R_low, in this case). The token supplier $13c$ sets the token supply rate to the value (R_low, in this case) indicated by the instruction.

When the condition in operation OP62 is not satisfied (No in operation OP62), the process proceeds to operation in OP64 in which the burst reading manager $12c$ determines whether or not the buffering of the arrived packet causes the queue length to change to a value that is larger than or equal to the second rate control threshold RCth2. That is, the burst reading manager 12c determines whether or not the queue length Qlen before the buffering of the arrived packet is smaller than the second rate control threshold RCth2 and the queue length Qlen+a after the buffering is larger than or equal to the second rate control threshold RCth2.

When the condition in operation OP64 is satisfied (Yes in operation OP64), this indicates the buffering of the arrived packet causes the queue length to change from a value that is smaller than the second rate control threshold RCth2 to a value that is larger than or equal to the second rate control threshold RCth2. In this case, in operation OP65, the burst reading manager 12c determines the token supply rate to be the shaping rate. The burst reading manager 12c issues, to the token supplier 13c, an instruction for setting the token supply rate to the determined rate (the shaping rate, in this case). The token supplier 13c sets the token supply rate to the value (the shaping rate, in this case) indicated by the instruction.

In the above-described processing, in accordance with the first rate control threshold RCth1 and the second rate control threshold RCth2, the buffer memory 16c is divided into three regions:

(Region 1) 0≤Qlen<RCth1,
(Region 2) RCth23 Qlen<RCth2, and
(Region 3) RCth2<Qlen≤Qmax.

When the region to which the queue length Qlen belongs changes from region 1 to region 2 as a result of the buffering of the arrived packet (Yes in operation OP62), the token supply rate is set to R_low in operation OP63. When the region to which the queue length Qlen belongs changes from region 2 to region 3 as a result of the buffering of the arrived packet (Yes in operation OP64), the token supply rate is set to the shaping rate in operation OP65.

When the conditions in operations OP62 and OP64 are not satisfied, this indicates that the region to which the queue length Qlen belongs does not change even when the arrived packet is buffered. In this case, in operation OP66, the burst reading manager 12c maintains the token supply rate without change.

In operation OP67, the arrived packet is buffered, so that the queue length Qlen becomes a value obtained by adding the size a of the arrived packet. Thereafter, packet reading processing is performed. Since the packet reading processing in operations OP67 to OP71b illustrated in FIG. 11 is substantially the same as the processing in operations OP12 to OP16b illustrated in FIG. 5, a description thereof is not given hereinafter.

When the queue length changes in operation OP62 from a value that is smaller than the first rate control threshold RCth1 to a value that is larger than or equal to the first rate control threshold RCth1 and is smaller than the second rate control threshold RCth2, the token supply rate is changed to a rate that is lower than the shaping rate. Consequently, the increase in the queue length is accelerated, so that the equilibrium state can be induced more quickly. However, since the increase in the queue length is accelerated, the possibility of a buffer flow increases. Accordingly, in operation OP64, when the queue length changes from a value that is smaller than the second rate control threshold RCth2 to a value that is larger than or equal to the second rate control threshold RCth2, the shaper 1c returns the output rate to the shaping rate to prevent an increase in the queue length. In packet reading processing during token supply, the token supply does not cause a change in the queue length. Thus, the packet reading processing is substantially the same as that in the first embodiment.

Not only the packet arrival but also packet reading causes the queue length to change. For example, when the packet reading has caused the queue length to change to a value that is larger than or equal to the first rate control threshold RCth1 to a value that is smaller than the first rate control threshold RCth1, an unwanted throughput reduction may be caused with the token supply rate being unchanged at R_low that is lower than the shaping rate. Accordingly, when the queue length changes to a value that is smaller than the first rate control threshold RCth1 after the packets are read, the burst reading manager 12c returns the token supply rate to the shaping rate.

FIG. 12 illustrates an example of a flow of token-supply-rate determination processing after the packet reading from the shaper 1c is finished. In FIG. 12, the token supply rate is also simply indicated as "supply rate".

The burst reading manager 12c determines whether or not the packet reading has caused the queue length Qlen to become smaller than the first rate control threshold RCth1. That is, in operation OP81, the burst reading manager 12c determines whether or not the queue length Qlen after the packet reading is smaller than the first rate control threshold RCth1.

When the queue length Qlen after the packet reading is smaller than the first rate control threshold RCth1 (Yes in operation OP81), the process proceeds to operation OP82 in which the burst reading manager 12c determines the token supply rate to be the value of the shaping rate. The burst reading manager 12c issues, to the token supplier 13c, an instruction for setting the token supply rate to the determined rate (the shaping rate, in this case). The token supplier 13c sets the token supply rate to the value (the shaping rate, in this case) indicated by the instruction.

When the queue length Qlen after the packet reading is larger than or equal to the first rate control threshold RCth1 (No in operation OP81), the token supply rate is not changed and the processing ends.

When the queue length is increasing, the shaper 1c according to the third embodiment reduces the token supply rate to a rate that is lower than the shaping rate, to accelerate an increase in the queue length. This arrangement can more quickly induce the equilibrium state to prepare for occurrence of a future burst.

Although two rate control thresholds are set for the buffer memory 16c in the third embodiment, the number of rate control thresholds is not limited thereto. That is, two or more rate control thresholds may be set so as to enable finer output-rate control.

<Modifications>

The shapers according to the first to third embodiments may not only be realized by electronic circuits serving as LSI functions, but also be realized by a CPU executing a shaping program using the above-described token bucket.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A band control apparatus comprising:
a buffer memory configured to hold and output data units on a first-in first-out basis;
a counter memory configured to hold a counter value; and
a processor configured to
add a value to the counter value on a basis of a rule,
reduce, when a first one of the data units is output from the buffer memory, a value corresponding to a size of the first data unit from the counter value,
cause the first data unit held by the buffer memory to be output when a first condition and second condition are satisfied, the first condition is a total size of the data units held by the buffer memory being smaller than a buffer threshold, and the second condition is that the counter value is larger than the size of the first data unit held by the buffer memory and the counter value is larger than a counter threshold, and
cause, when the first condition is not satisfied, the data units held by the buffer memory to be output in sequence with the first data unit first, until a third condition is satisfied, wherein
the third condition is that the first condition is satisfied or the second condition is not satisfied, and
wherein the buffer memory has n buffer thresholds Qth(1) to Qth(n) (where n is an integer of 2 or more), the n buffer thresholds Qth(i) (where 0<i≤n) i being between 0 and a smaller value than a size of the buffer memory and being an ascending value;
the counter memory has n counter thresholds Tth(1) to Tth(n), the n counter thresholds Tth(j) j being between 0 and a value that is smaller than or equal to a maximum value of the counter value and being a decending value; and
when the total size of the data units held by the buffer memory is larger than or equal to Qth(i−1) and is smaller than Qth(i), the processor causes the data units held by the buffer memory to be output in sequence with the first data unit first, until the counter value becomes a value that is smaller than Tth(j), until the total size of the data units held by the buffer memory becomes a value that is smaller than Qth(i−1), or until the counter value becomes a value that is smaller than the size of the first data unit held by the buffer memory, and when the total size of the data units held by the buffer memory is larger than or equal to Qth(n), the processor causes the data units to be output from the buffer memory, until the total size of the data units held by the buffer memory becomes a value that is smaller than Qth(n) or until the counter value becomes a value that is smaller than the size of the first data unit held by the buffer memory.

2. The band control apparatus according to claim 1, wherein the buffer memory has a first rate control threshold and a second rate control threshold that is larger than the first rate control threshold; and
when the total size of the data units held by the buffer memory changes to a value that is larger than or equal to the first rate control threshold, the processor changes a rate of adding the value to the counter value to a rate below a shaping rate, and when the total size of the data units held by the buffer memory changes to a value that is larger than or equal to the second rate control threshold, the processor changes the rate of adding the value to the counter value to the shaping rate.

3. The band control apparatus according to claim 2, wherein, when the total size of the data units held by the buffer memory changes to a smaller value than the first rate control threshold as a result of data-units being output from the buffer memory, the processor changes the rate of adding the value to the counter value to the shaping rate.

4. A band control method comprising:
adding a value to a held counter value on a basis of a rule;
reducing, when a first one of data units is output from a buffer memory that holds and outputs the data units on a first-in first-out basis, a value corresponding to a size of the first data unit from the counter value;
causing the first data unit held by the buffer memory to be output when a first condition and second condition are satisfied, the first condition is that a total size of the data units held in the buffer memory is smaller than a predetermined buffer threshold, and the second condition is that the counter value is larger than the size of the first data unit held in the buffer memory and the counter value is larger than a predetermined counter threshold; and
causing, when the first condition is not satisfied, the data units held in the buffer memory to be output in sequence with the first data unit first, until a third condition is satisfied, wherein
the third condition is that the first condition is satisfied or the second condition is not satisfied, and
n buffer thresholds Qth(1) to Qth(n) (where n is an integer of 2 or more) are stored, the n buffer thresholds Qth(i) (where 0<i≤n) i being between 0 and a smaller value than a size of the buffer memory and being an ascending value;
n counter thresholds Tth(1) to Tth(n) are stored, the n counter thresholds Tth(j) j being between 0 and a value that is smaller than or equal to a maximum value of the counter value and being a decending value; and
when the total size of the data units held by the buffer memory is larger than or equal to Qth(i−1) and is smaller than Qth(i), the causing causes the data units held by the buffer memory to be output in sequence with the first data unit first, until the counter value becomes a value that is smaller than Tth(j), until the total size of the data units held by the buffer memory becomes a value that is smaller than Qth(i−1), or until the counter value becomes a value that is smaller than the size of the first data unit held by the buffer memory, and when the total size of the data units held by the buffer memory is larger than or equal to Qth(n), the causing causes the data units to be output from the buffer memory, until the total size of the data units held by the buffer memory becomes a value that is smaller than Qth(n) or until the counter value becomes a value that is smaller than the size of the first data unit held by the buffer memory.

5. The band control method according to claim 4, wherein the buffer memory has a first rate control threshold and a second rate control threshold that is larger than the first rate control threshold; and
when the total size of the data units held by the buffer memory changes to a value that is larger than or equal to the first rate control threshold, the causing changes a rate of adding the value to the counter value to a rate that falls below a shaping rate, and when the total size of the data units held by the buffer memory changes to a value that is larger than or equal to the second rate control threshold, the causing changes the rate of adding the value to the counter value to the shaping rate.

6. The band control method according to claim 4, wherein, when the total size of the data units held by the buffer memory changes to a smaller value than the first rate control threshold as a result of data-units being output from the buffer memory, the causing changes the rate of adding the value to the counter value to the shaping rate.

7. A non-transitory computer-readable storage medium in which a band control program is recorded, the band control program causing a computer to execute:

adding a value to a held counter value on a basis of a rule;

reducing, when a first one of data units is output from a buffer memory that holds and outputs the data units on a first-in first-out basis, a value corresponding to a size of the first data unit from the counter value;

causing the first data unit held by the buffer memory to be output when a first condition and a second condition are satisfied, the first condition is that a total size of the data units held in the buffer memory is smaller than a predetermined buffer threshold is satisfied, and the second condition is that the counter value is larger than the size of the first data unit held in the buffer memory and the counter value is larger than a predetermined counter threshold; and causing, when the first condition is not satisfied, the data units held in the buffer memory to be output in sequence with the first data unit first, until a third condition is satisfied, wherein the third condition is that the first condition is satisfied or the second condition is not satisfied, and n buffer thresholds $Qth(1)$ to $Qth(n)$ (where n is an integer of 2 or more) are stored, the n buffer thresholds $Qth(i)$ (where $0 < i \leq n$) i being between 0 and a smaller value than a size of the buffer memory and being an ascending value;

n counter thresholds $Tth(1)$ to $Tth(n)$ are stored, the n counter thresholds $Tth(j)$ j being between 0 and a value that is smaller than or equal to a maximum value of the counter value and being a decending value; and when the total size of the data units held by the buffer memory is larger than or equal to $Qth(i-1)$ and is smaller than $Qth(i)$, the causing causes the data units held by the buffer memory to be output in sequence with the first data unit first, until the counter value becomes a value that is smaller than $Tth(j)$, until the total size of the data units held by the buffer memory becomes a value that is smaller than $Qth(i-1)$, or until the counter value becomes a value that is smaller than the size of the first data unit held by the buffer memory, and when the total size of the data units held by the buffer memory is larger than or equal to $Qth(n)$, the causing causes the data units to be output from the buffer memory, until the total size of the data units held by the buffer memory becomes a value that is smaller than $Qth(n)$ or until the counter value becomes a value that is smaller than the size of the first data unit held by the buffer memory.

\* \* \* \* \*